US010498910B2

(12) United States Patent
Shimizu et al.

(10) Patent No.: US 10,498,910 B2
(45) Date of Patent: Dec. 3, 2019

(54) IMAGE FORMING APPARATUS FOR DISPLAYING CONFERENCE INFORMATION, NON-TRANSITORY COMPUTER-READABLE RECORDING MEDIUM, CONFERENCE SYSTEM AND METHOD FOR CONTROLLING CONFERENCE SYSTEM

(71) Applicant: Konica Minolta, Inc., Chiyoda-ku, Tokyo (JP)

(72) Inventors: Hideaki Shimizu, Hino (JP); Tohru Fujiwara, Yokohama (JP); Kazuhisa Kishimoto, Mitaka (JP); Katsutoshi Sawada, Hino (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 37 days.

(21) Appl. No.: 15/492,620

(22) Filed: Apr. 20, 2017

(65) Prior Publication Data
US 2017/0324875 A1 Nov. 9, 2017

(30) Foreign Application Priority Data
May 6, 2016 (JP) ................................. 2016-093444

(51) Int. Cl.
*H04N 1/00* (2006.01)
(52) U.S. Cl.
CPC ..... *H04N 1/00408* (2013.01); *H04N 1/00244* (2013.01); *H04N 2201/0094* (2013.01)
(58) Field of Classification Search
None
See application file for complete search history.

(56) References Cited

U.S. PATENT DOCUMENTS 8,610,935 B1 * 12/2013 McKinley ............. G06F 3/1204
358/1.15
2003/0035122 A1 * 2/2003 Amarger ............ H04N 1/00204
358/1.1

(Continued)

FOREIGN PATENT DOCUMENTS

JP 2013239021 A * 11/2013
JP 2013239021 A * 11/2013

(Continued)

*Primary Examiner* — Mohammad H Ghayour
*Assistant Examiner* — Pawan Dhingra
(74) *Attorney, Agent, or Firm* — Buchanan Ingersoll & Rooney PC

(57) ABSTRACT

Disclosed is an image forming apparatus, including: an input unit that inputs an original data; an image forming unit that forms an image on a recording sheet in accordance with the original data; an operation panel that comprises a display unit and an operating unit and that receives an operation for entering a job for forming the image on the recording sheet by using the image forming unit; a display control unit that displays one or more types of window on the display unit of the operation panel; and a conference information obtaining unit that obtains conference information of a conference held in a conference room which is placed near the image forming apparatus, from a predetermined conference management server that manages the conference information of the conference, wherein the display control unit displays the conference information on the display unit from the conference management server.

16 Claims, 23 Drawing Sheets

(56) References Cited

U.S. PATENT DOCUMENTS

| | | | | |
|---|---|---|---|---|
| 2005/0174609 A1* | 8/2005 | Thurlow | ............ | H04N 1/00278 358/425 |
| 2007/0109587 A1* | 5/2007 | Yamakawa | ........ | H04N 1/00204 358/1.14 |
| 2009/0086261 A1* | 4/2009 | Irino | ..................... | G06F 21/608 358/1.15 |
| 2010/0073720 A1* | 3/2010 | Wakui | ................... | G06F 3/1219 358/1.15 |
| 2010/0245886 A1* | 9/2010 | Okajima | ............... | G06F 21/608 358/1.15 |
| 2010/0303382 A1* | 12/2010 | Tamura | .................. | G06K 9/033 382/278 |
| 2011/0199628 A1* | 8/2011 | Tohki | ................ | H04N 1/0035 358/1.13 |
| 2012/0212763 A1* | 8/2012 | Honma | ................ | G06F 3/1204 358/1.13 |

FOREIGN PATENT DOCUMENTS

| | | |
|---|---|---|
| JP | 2014-022991 A | 2/2014 |
| JP | 2016-004380 A | 1/2016 |

\* cited by examiner

FIG.4

| IMAGE FORMING APPARATUS (PRINT APPARATUS) | COFNERENCE ROOM |
|---|---|
| MFP1 | A,B |
| MFP2 | C,D |
| MFP3 | E,F,G,H |

CONFERENCE ROOM RELATED
INFORMATION REGISTRATION TABLE

FIG.5

| REGISTERED CONFERENCE INFORMATION 1 ||
|---|---|
| DATE AND TIME | XXXX/XX/XX 10:00-11:00 |
| PLACE | CONFERENCE ROOM A |
| PROMOTER | TARO SATO |
| TITLE | LIFE-WORK BALANCE DISCUSSION |
| CONTENTS | OPEN CONFERENCE. PLEASE JOIN! |
| REGISTERED CONFERENCE INFORMATION 2 ||
| DATE AND TIME | XXXX/XX/XX 13:00-15:00 |
| PLACE | CONFERENCE ROOM D |
| PROMOTER | JIRO SASAKI |
| TITLE | DEVELOPMENT METHOD DISCUSSION |
| CONTENTS | ANYONE CAN PARTICIPATE. PLEASE DISCUSS ACTIVELY. |
| REGISTERED CONFERENCE INFORMATION 3 ||
| DATE AND TIME | XXXX/XX/XX 11:00-12:00 |
| PLACE | CONFERENCE ROOM A |
| PROMOTER | SABURO TANAKA |
| TITLE | OPEN DISCUSSION |
| CONTENTS | EVERYONE CAN DISCUSS ANYTHING! |

CONFERENCE PARTICIPATION HISTORY
OF ONE USER

FIG.13

| REGISTERED CONFERENCE INFORMATION 1 ||
|---|---|
| TIME OF CONFERENCE | XXXX/XX/XX 10:00-11:00 |
| PLACE OF CONFERENCE | CONFERENCE ROOM C |
| PROMOTOR | TARO SATO |
| TITLE | LIFE-WORK BALANCE |
| CONTENTS | OPEN CONFERENCE FOR LIFE-WORK BALANCE |
| REGISTERED CONFERENCE INFORMATION 2 ||
| TIME OF CONFERENCE | XXXX/XX/XX 10:00-12:00 |
| PLACE OF CONFERENCE | CONFERENCE ROOM D |
| PROMOTOR | JIRO SASAKI |
| TITLE | REFACTORING METHOD DISCUSSION |
| CONTENTS | REFACTORING |

FIG.14
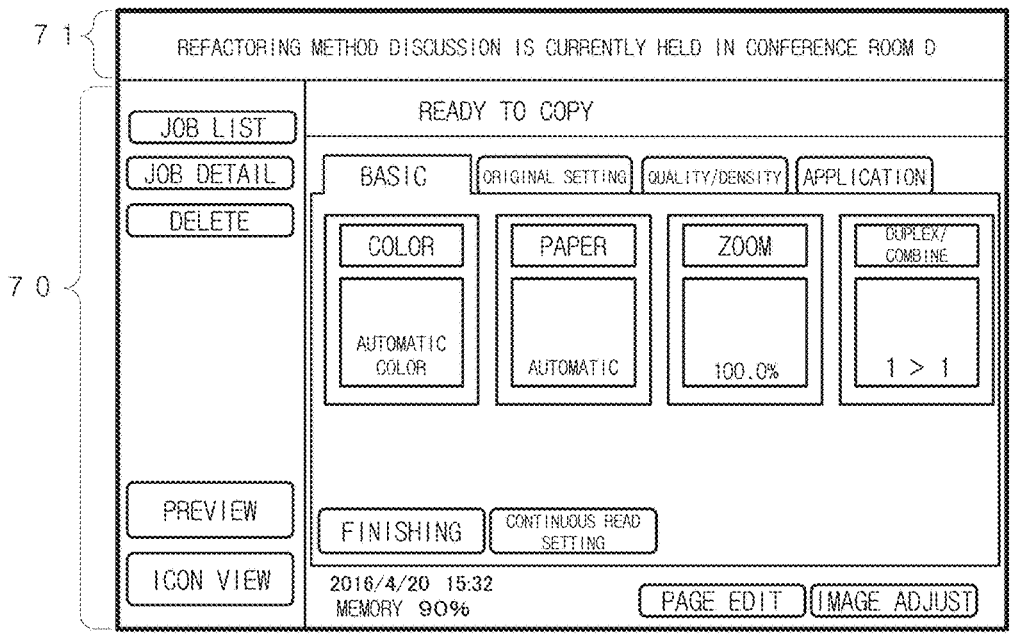
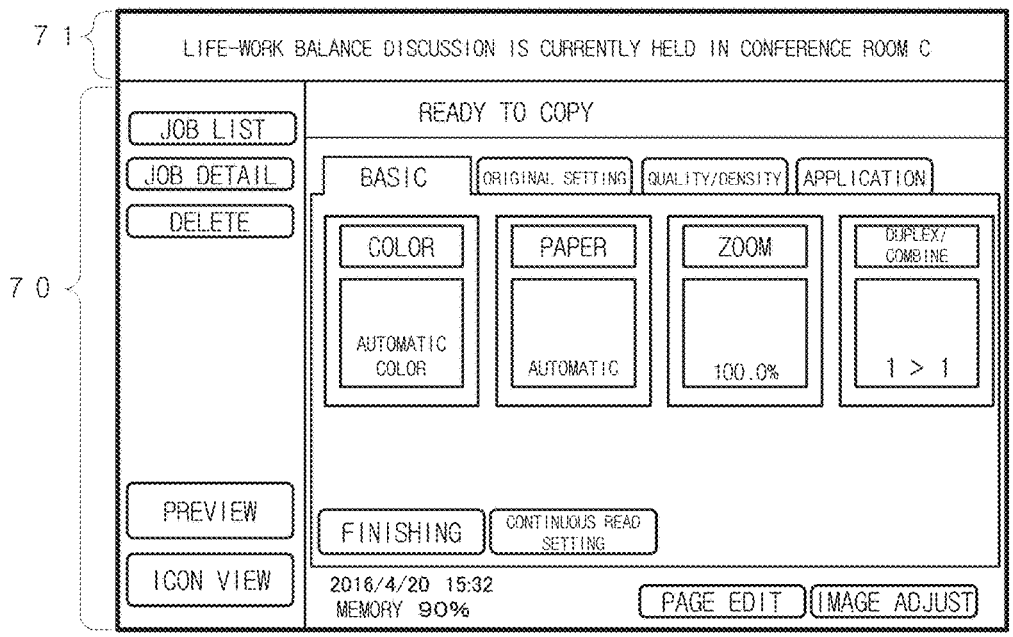

FIG.23

| ROOM NAME | MFP NAME | DISTANCE (m) |
|---|---|---|
| CONFERENCE ROOM A | MFP1 | 2 |
| | MFP2 | 30 |
| | MFP3 | 50 |
| CONFERENCE ROOM B | MFP1 | 5 |
| | MFP2 | 26 |
| | MFP3 | 40 |
| ... | ... | ... |
| CONFERENCE ROOM H | MFP1 | 50 |
| | MFP2 | 40 |
| | MFP3 | 10 |

130

IMAGE FORMING APPARATUS FOR DISPLAYING CONFERENCE INFORMATION, NON-TRANSITORY COMPUTER-READABLE RECORDING MEDIUM, CONFERENCE SYSTEM AND METHOD FOR CONTROLLING CONFERENCE SYSTEM

BACKGROUND OF THE INVENTION

Field of the Invention

The present invention relates to an image forming apparatus, a non-transitory computer-readable recording medium, a conference system and a method for controlling a conference system for displaying the predetermined information which is not related to the operation for the image forming apparatus, on the operation panel.

Description of Related Art

There is technology for displaying various types of information which is not related to the operation for the image forming apparatus, on the operation panel. For example, in Japanese Patent Application Publication No. 2016-4380, by using the operation panel, the answer to the questionnaires is received from a user.

Further, the list of the conferences is displayed on the operation panel of the image forming apparatus in accordance with the user's instruction. In case that a participant of a conference which is currently held selects the conference in the list, the image forming apparatus allows the document which is suddenly used in the conference to be printed (for example, see Japanese Patent Application Publication No. 2014-22991).

The conference includes the closed type of conference for only the participants who are previously designated and the open type of conference in which anyone can participate. In case of the open type of conference, anyone can participate. However, in case that everyone is not informed of the guidance information indicating the contents and the place of the conference, it cannot be known to everyone where the conference is held or what conference is held. Therefore, the members who actually participate are limited.

As a posting method for publicly posting the information of the conference by a promoter who wants to make many people participate in the conference in order to activate the conference, for example, the digital signage, the posting and the like are included. However, in case that it is not necessary that a person goes to the posting location, there is a low possibility that the person expressly goes to look at the posted information. Even if the above information is displayed or posted at the location by which people pass, each person must consciously read the information displayed on the screen or the posted information. As a result, many people do not actually look at the information and do not participate in the conference. Further, even if a person passes by the conference room, the person does not recognize the contents of the conference. Further, the person does not know that the conference is the open type of conference or the closed type of conference. Therefore, it is difficult for the person to participate in the conference.

In the technology disclosed in Japanese Patent Application Publication No. 2016-4380, only the questionnaires and the like are displayed on the operation panel of the image forming apparatus. The above technology is not one for providing the information relating to the conference. The technology disclosed in Japanese Patent Application Publication No. 2014-22991 is effective one for the participants of the conference which is currently held. However, it is not possible to inform a person who is not interested in the conference, of the conference information.

SUMMARY

To achieve at least one of the abovementioned objects, an image forming apparatus reflecting one aspect of the present invention, comprises:

an input unit that inputs an original data;

an image forming unit that forms an image on a recording sheet in accordance with the original data input by the input unit, and outputs the recording sheet;

an operation panel that comprises a display unit and an operating unit and that receives an operation for entering a job for forming the image on the recording sheet by using the image forming unit;

a display control unit that displays one or more types of window on the display unit of the operation panel; and a conference information obtaining unit that obtains conference information of a conference held in a conference room which is placed near the image forming apparatus, from a predetermined conference management server that manages the conference information of the conference, wherein the display control unit displays the conference information on the display unit, which is obtained by the conference information obtaining unit from the conference management server.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIG. 4 is an example of the conference room related information registration table;

FIG. 5 is a view showing the conference information stored in the database of the conference management server;

FIG. 13 is a view showing the conference information of the conferences which are currently held in the conference rooms placed near MFP2 and which are registered in the conference management server;

FIG. 14 is a view showing an example in which the conference information of the conference having the higher correlation with the user is preferentially displayed;

FIG. 23 is a view showing an example of the distance registration table stored in the conference management server.

DETAILED DESCRIPTION OF PREFERRED EMBODIMENTS

Hereinafter, preferred embodiments of the present invention will be explained with reference to the accompanying drawings.

First Embodiment

Figure 1:
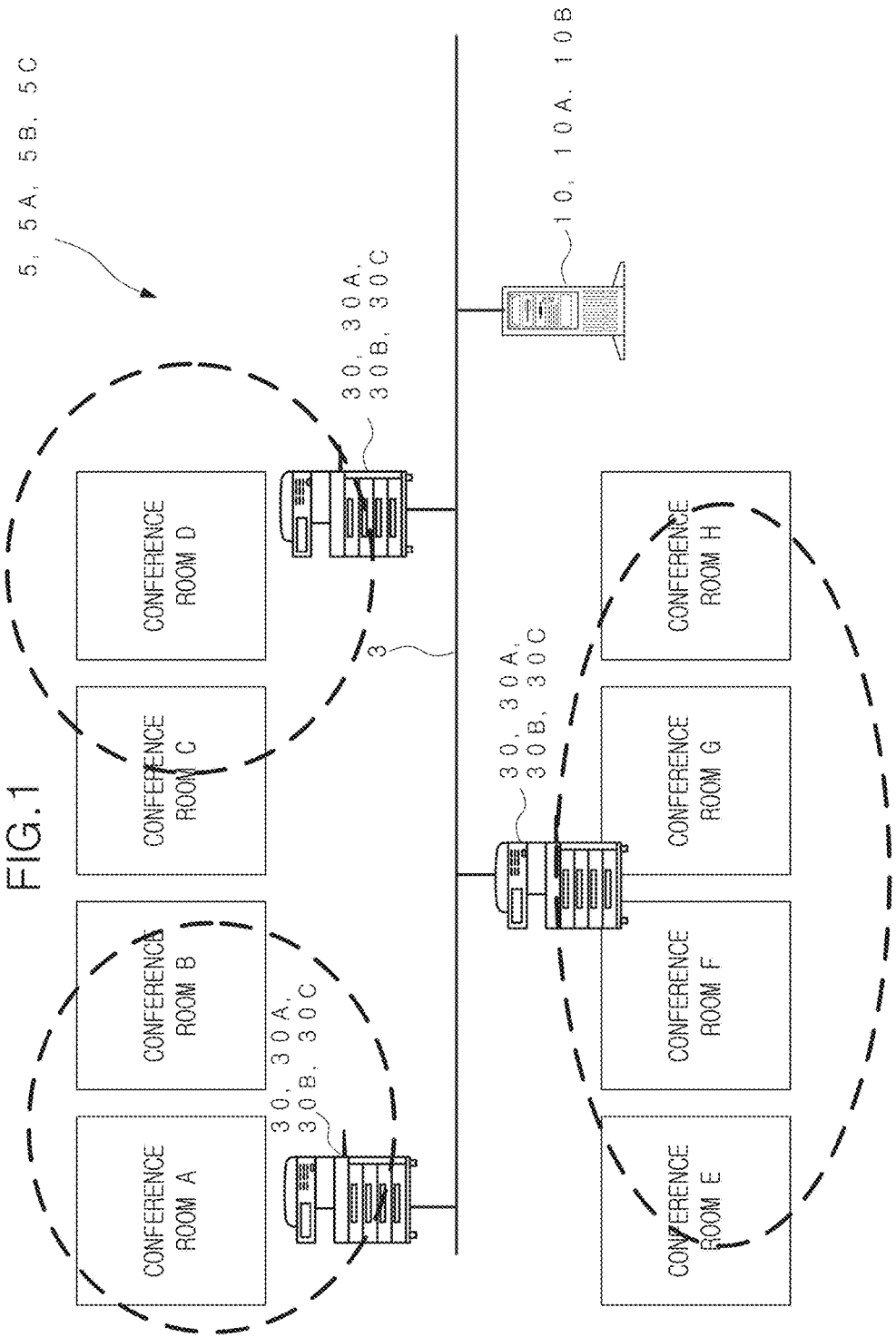
FIG. 1 is a view showing an example of the configuration of the conference system according to the first embodiment and an example of the operating environment thereof.

FIG. 1 is a view showing an example of the configuration of the conference system 5 according to the first embodiment and an example of the operating environment thereof. The conference system 5 comprises a conference management server 10 and a plurality of image forming apparatuses 30 so as to be connected with each other via a network 3, such as a LAN (Local Area Network) or the like. Hereinafter, the image forming apparatus 30 is also referred to as MFP. In case that the conference management server and the like disclosed in each of the first to the fourth embodiments are separately explained, the reference numeral to which the alphabetical mark, such as A, B or the like, is attached, is used. In case that the conference management servers and the like disclosed in the first to the fourth embodiments are comprehensively explained, the reference numeral to which the alphabetical mark is not attached, is used.

In each embodiment, as each place of the conferences managed by the conference management server 10, there are eight conference rooms A to H. Further, the image forming apparatuses 30 are MFP1, MFP2 and MFP3. MFP1 is provided near the conference rooms A and B, MFP2 is provided near the conference rooms C and D, and MFP3 is provided near the conference rooms E to H.

The conference management server 10 registers and manages the conference information of each conference. For example, the information including the date and time, the place, the promoter, the title, the contents and the like of the conference, is registered and managed as the conference information in the database 17 (See FIG. 2). The conference management server 10 manages which conference room is placed near each image forming apparatus 30. A user can access to the conference management server 10 by using a browser, and can register the conference information and view the registered conference information via a web interface.

The image forming apparatus 30 is so-called multi function peripheral (MFP) which has the copy function for forming an image on a recording sheet by optically reading an original to print out the image of the original, the scan function for storing the image data of the read original as a file and transmitting the image data to an external terminal via the network 3, the print function for printing out a document or an image on a recording sheet in accordance with the print job received from an external information processing terminal via the network 3, and the like.

Further, the image forming apparatus 30 has the function for displaying the conference information of the conferences which are held in the conference rooms which are placed near the above image forming apparatus 30, to provide the information of the conferences which are held near the above image forming apparatus 30, for the user who copies the document or takes the printed document at the above image forming apparatus 30.

Figure 2:
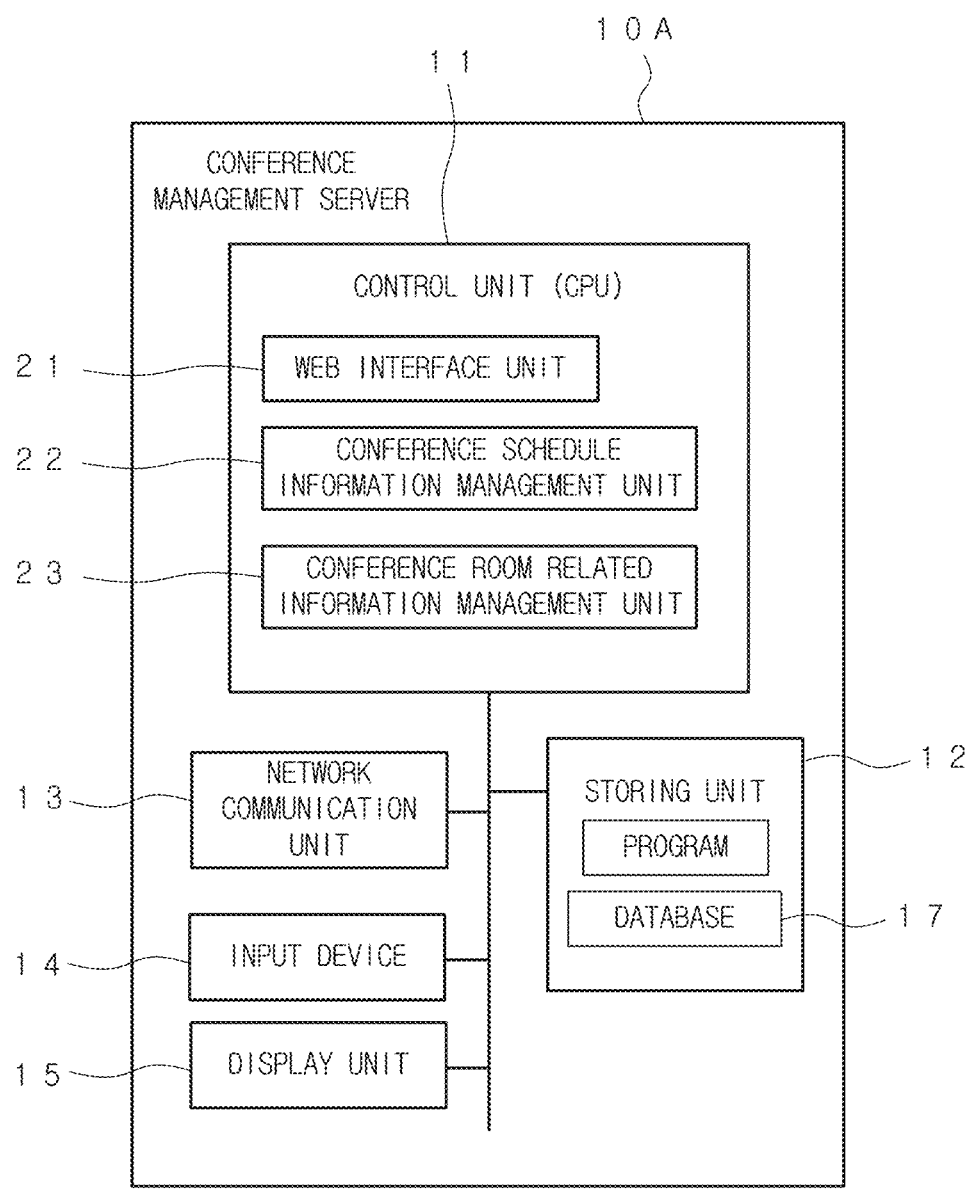
FIG. 2 is a block diagram showing the configuration of the conference management server according to the first embodiment.

FIG. 2 is a block diagram showing the schematic configuration of the conference management server 1 OA according to the first embodiment. The conference management server 10A is a computer having the server function. The conference management server 10A comprises a control unit 11 including a CPU (Central Processing Unit) as a main unit, a storing unit 12 including a RAM (Random Access Memory), a ROM (Read Only Memory), a nonvolatile memory, a hard disk drive and the like, a network communication unit 13 for communicating with the image forming apparatuses 30, other external devices and the like, via the network 3, an input device 14 including a keyboard, a mouse, a touch panel and the like, and a display unit 15 including a liquid crystal display or the like.

In the storing unit 12, the programs executed by the control unit 11, the above-described database 17 and the like are stored.

The control unit 11 executes various types of processes in accordance with the programs stored in the storing unit 12. The control unit 11 has the function as the web interface unit 21, the conference schedule information management unit 22, the conference room related information management unit 23 and the like by executing the programs stored in the storing unit 12.

The web interface unit 21 has the function for preparing and transmitting the web page for registering the conference information in the database 17 by a user and viewing the registered conference information, and the function for instructing an external terminal and the like to display the web page via the network.

The conference schedule information management unit 22 has the function for registering the information relating to the conference, which is received via the above web page, in the database 17, and for reading out the conference information from the database 17 according to the request from the external terminal, the image forming apparatus 30 and the like to transmit the above conference information to the image forming apparatus 30 which transmits the above request, and the like.

The conference room related information management unit 23 manages the correspondence relation between one image forming apparatus 30 and one or more conference rooms which are placed near the above one image forming apparatus 30. In detail, the conference room related information registration table 60 is prepared as shown in FIG. 4 and is stored in the storing unit 12. In the example shown in FIG. 4, the conference rooms A and B are related to MFP1 which is provided near the conference rooms A and B, the conference rooms C and D are related to MFP2 which is provided near the conference rooms C and D, and the conference rooms E to H are related to MFP3 which is provided near the conference rooms E to H.

The conference room related information can be registered and changed in the conference room related information registration table 60 via the web interface displayed when the user accesses to the server management server 10 via a browser. However, the person who can access to the server management server 10 is restricted to the person who obtains the specific permission, such as the administrator or the like.

Figure 3:
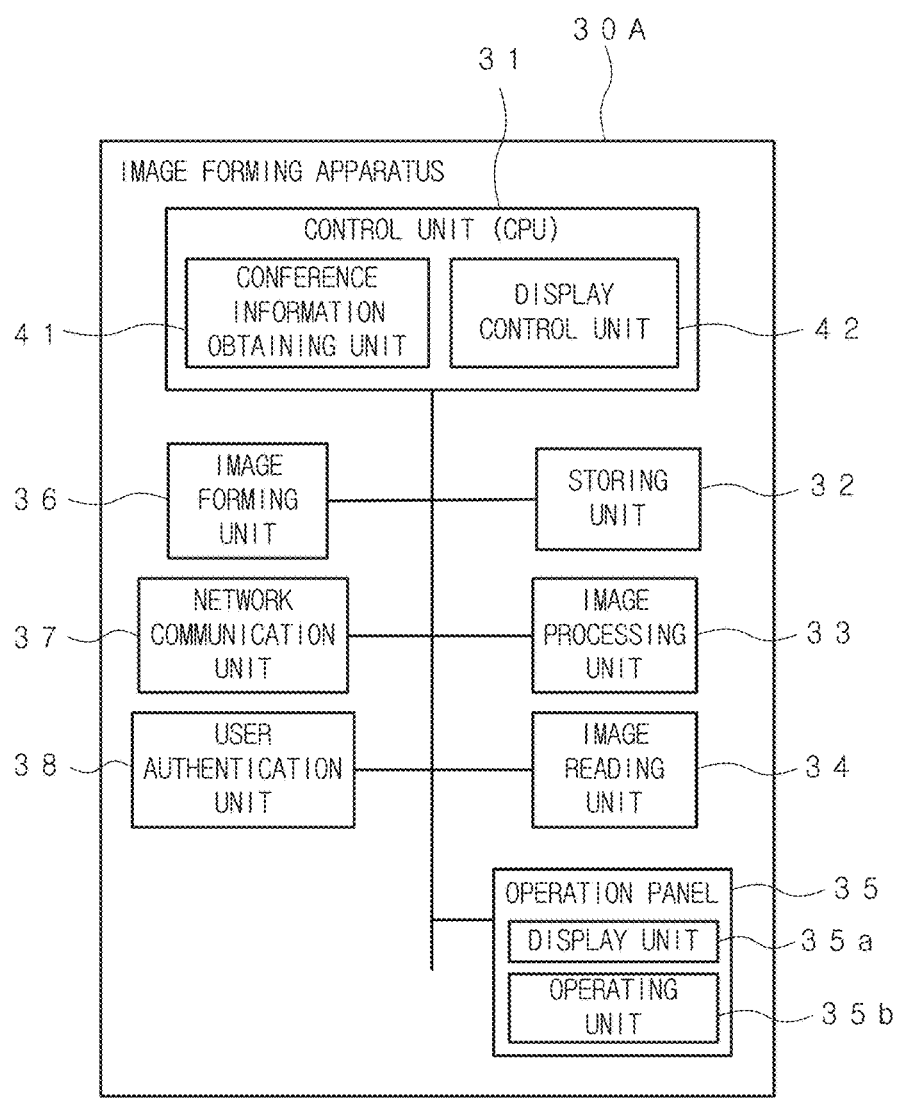
FIG. 3 is a block diagram showing the schematic configuration of the image forming apparatus according to the first embodiment.

FIG. 3 is a block diagram showing the schematic configuration of the image forming apparatus 30A. The image forming apparatus 30A comprises a control unit 31 for entirely controlling the operation of the image forming apparatus 30A. The control unit 31 comprises a CPU and the like as the main unit. The control unit 31 is connected with a storing unit 32, an image processing unit 33, an image reading unit 34, an operation panel 35, an image forming unit 36, a network communication unit 37, a user identification unit 38 and the like.

The storing unit 32 comprises a ROM, a RAM, a hard disk drive, a nonvolatile memory and the like. In the storing unit 32, various types of programs and data are stored. By executing various processes in accordance with these programs by the control unit 31, each function of the image forming apparatus 30A is realized.

The image processing unit 33 carries out the compression/decompression process for the image data, and the like in addition to the processings, such as the enlargement/reduction or the rotation of image data.

The image reading unit (the reading device) 34 has the function for obtaining the image data by optically reading the original.

The operation panel 35 comprises a display unit 35a and an operating unit 35b. The display unit 35a comprises a liquid crystal display or the like, and has the function for displaying various types of operation windows, setting windows and the like. The operating unit 35b comprises various types of operation switches, such as a start button and the like, a touch panel provided on the display screen of the display unit 35a, and the like. The touch panel detects the coordinate position on which the display screen of the display unit 35a is pressed down by a touch pen, the user's finger or the like.

The image forming unit 36 has the function for forming an image on the recording sheet in accordance with the image data. In this embodiment, the image forming unit 36 is configured as a so-called laser printer which comprises a conveying device for the recording sheet, a photoconductive drum, a charging device, a laser unit, a developing device, a transfer and separation device, a cleaning device and a fixing device, and which forms an image by the electrophotographic process. Alternatively, an image may be formed by another type of printer.

The network communication unit 37 has the function for communicating with the conference management server 10, other external devices and the like via the network 3.

The user identification unit 38 detects and identifies the user who uses the image forming apparatus 30A. For example, the user identification unit 38 is an IC card reader for reading an IC card in which the user authentication information is registered, or the like. The user identification unit 38 may be a vein scanning device for carrying out the user authentication by the vein authentication. Alternatively, the user identification unit 38 may be a unit for carrying out the user authentication by entering the user ID and the password via the operation panel 35 to log in the image forming apparatus 30A.

The original data used for the image forming includes the image data obtained by optically reading the original in the image reading unit 34, the print data received from an external device via the network communication unit 37, and the like. Each of the image reading unit 34 and the network communication unit 37 has the function as the input unit for inputting the original data.

The control unit 31 of the image forming apparatus 30A has the function as the conference information obtaining unit 41 and the display control unit 42 by executing the programs stored in the storing unit 32.

The conference information obtaining unit 41 obtains the conference information and the like from the conference management server 10. The display control unit 42 controls the display unit 35a of the operation panel 35 so as to display the conference information obtained from the conference management server 10A, various types of windows, and the like.

FIG. 5 shows the conference information stored in the database 17 of the conference management server 10A. In FIG. 5, as the conference information, the registered conference information 1, 2 and 3 is stored. The registered conference information includes the date and time, the place, the promoter, the title, the contents and the like of the conference.

In the example shown in FIG. 5, as the registered conference information 1, the conference which is held from 10:00 on XXXX/XX/XX in the conference room A is registered. As the registered conference information 2, the conference which is held from 13:00 on XXXX/XX/XX in the conference room D is registered. As the registered conference information 3, the conference which is held from 11:00 on XXXX/XX/XX in the conference room A is registered.

Figure 6:
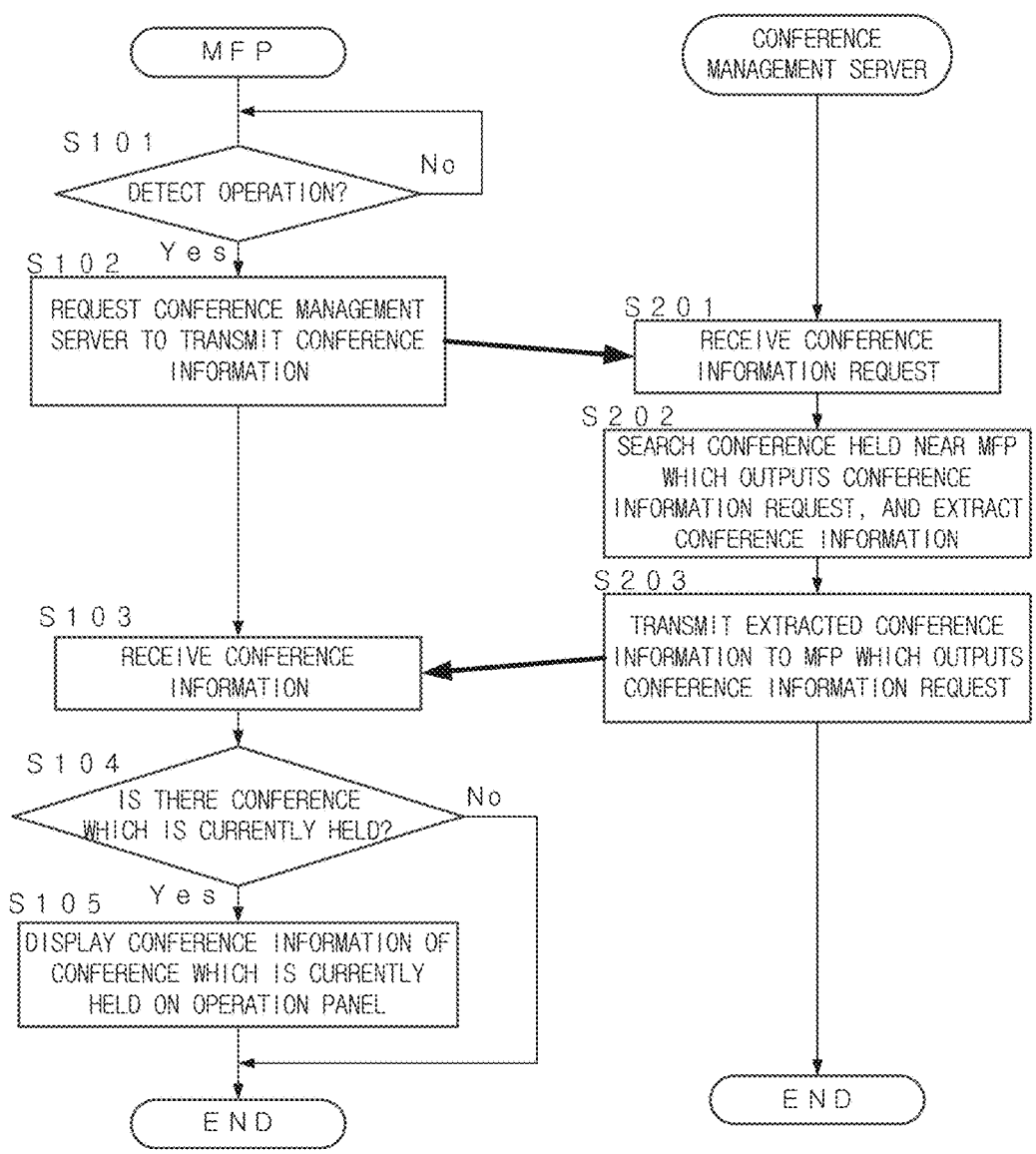
FIG. 6 is a flowchart showing the operation for displaying the conference information on the operation panel of the image forming apparatus in the conference system according to the first embodiment.

FIG. 6 is a flowchart showing the operation of the image forming apparatus 30A and the conference management server 10A when the conference information is displayed on the operation panel 35 of the image forming apparatus 30A (MFP).

The image forming apparatus 30A (MFP) monitors whether the operation is received from a user (Step S101; No). When the image forming apparatus 30A detects the operation from the user (Step S101; Yes), the image forming apparatus 30A outputs the conference information request to the conference management server 10A to request the conference management server 10A to transmit the conference information to the image forming apparatus 30A (Step S102). Alternatively, even though the operation is not received from the user, when the image forming apparatus 30A detects the user who approaches the image forming apparatus 30A or who stays in front of the image forming apparatus 30A, the image forming apparatus 30A may output the conference information request.

When the conference management server 10A receives the conference information request from the image forming apparatus 30A (Step S201), the conference management server 10A specifies the conference room which is related to the image forming apparatus 30A which outputs the conference information request, by referring the conference room related information registration table 60 shown in FIG. 4. Then, the conference management server 10A extracts the conference information of the conference which is held in the specified conference room, from the database 17 (Step S202). The conference management server 10A transmits the extracted conference information to the image forming apparatus 30A which outputs the conference information request (Step S203).

When the image forming apparatus 30A receives the conference information from the conference management server 10A (Step S103), the image forming apparatus 30A judges whether the conference which is currently held therearound exists or not in accordance with the received conference information (Step S104). For example, by comparing the conference opening time included in the conference information with the current time, it may be judged whether the conference is currently held. When the conference which is currently held exists (Step S104; Yes), the image forming apparatus 30A displays the conference information of the conference which is currently held, on the display unit 35a of the operation panel 35 thereof (Step S105).

For example, in the situation in which registered conference information 1 to 3 shown in FIG. 5 is registered in the database 17 of the conference management server 10A, it is assumed that a user starts operating MFP2 at 10:05 on XXXX/XX/XX to copy the document. Because the conference rooms which are placed near MFP2 are the conference rooms C and D in the conference room related information registration table 60 shown in FIG. 4, the conference management server 10 extracts the registered conference information 1 indicating that the conference room C is the place of the conference and the registered conference information 2 indicating that the conference room D is the place of the conference from the database 17, and transmits the extracted registered conference information to MFP2 in response to the conference information request output from MFP2.

Figure 7:
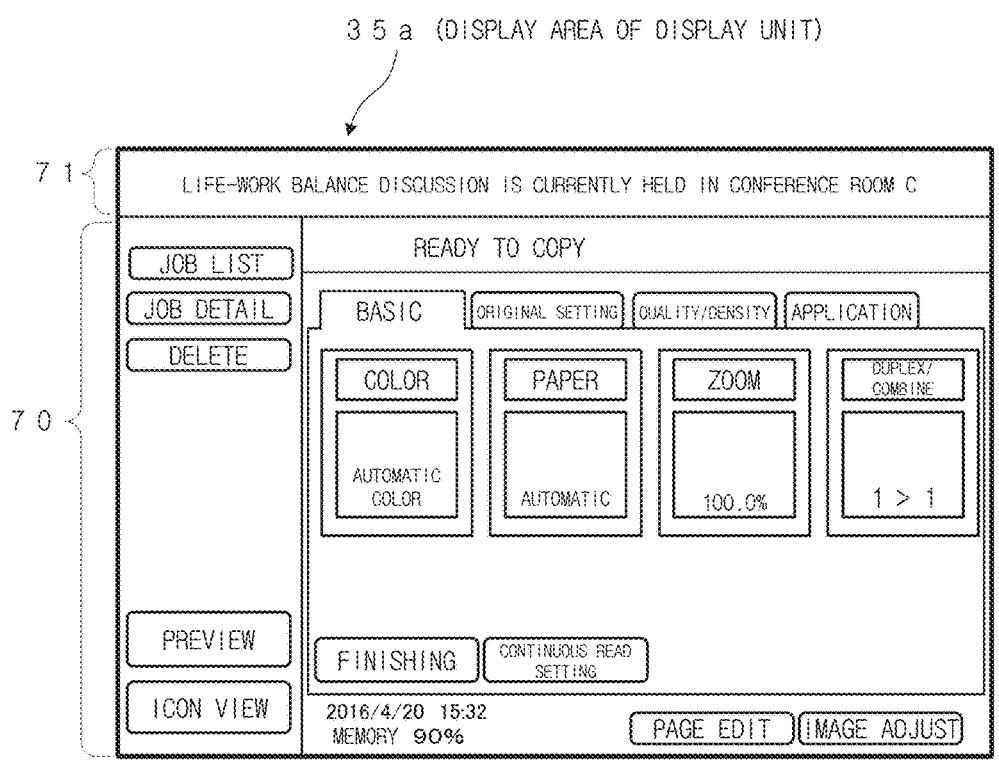
FIG. 7 is a view showing the situation in which the conference information is displayed in the conference information display space which is provided on the upper side of the copy operation window.

MFP2 displays the conference information indicated in the registered conference information 1 relating to the conference which is held at the current time (10:05), on the operation panel 35 thereof among the registered conference information 1 and 2 received from the conference management server 10. For example, as shown in FIG. 7, the conference information display space 71 for displaying one line of the information is provided on the upper side of the copy operation window 70 for inputting various types of operations for entering a copy job. Then, the image forming apparatus 10A displays the conference information in the conference information display space 71. The conference information display space 71 may be provided on the right side, the left side or the lower side of the copy operation window 70 other than the upper side of the copy operation window 70.

Figure 8:
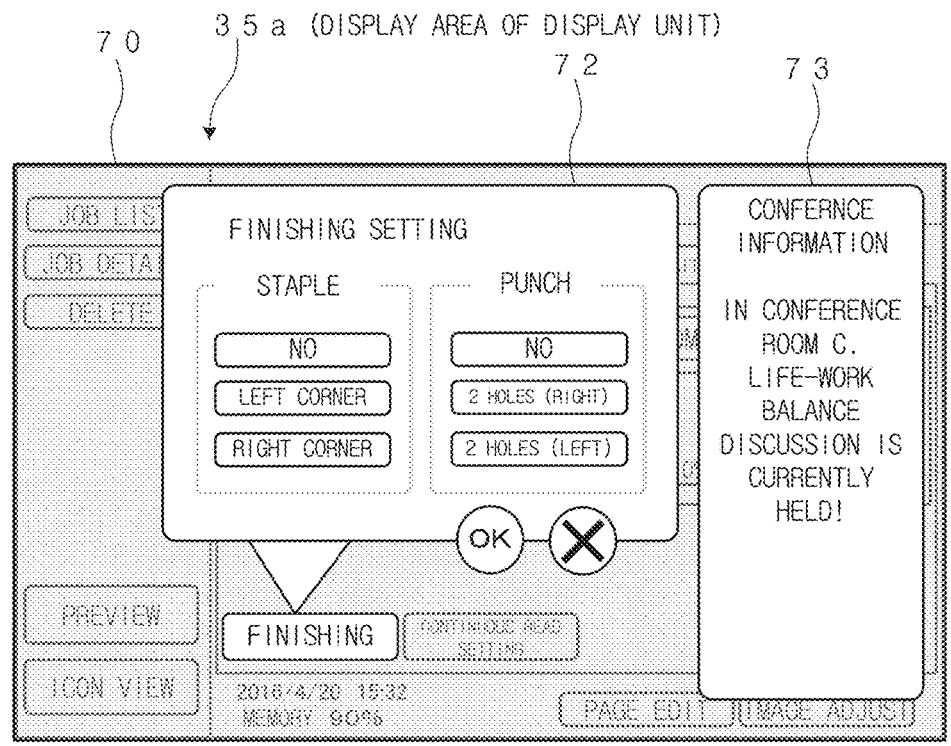
FIG. 8 is a view showing the situation in which the conference information is displayed by using the blank area of the window.

Alternatively, the conference information may be displayed in the blank area of the operation window (the area in which meaningful information is not displayed). For example, in the window shown in FIG. 8, the meaningful information is displayed in the pop-up window 72 and the grayed-out portion other than the pop-up window 72 is the blank area. By using the grayed-out portion, the conference information 73 is displayed.

In case that the conference information to be displayed indicates a plurality of conferences, when the display space is limited like the conference information display space 71 shown in FIG. 7, the conference information of each conference may be alternately and periodically displayed in the display space. In case that the display space (for example, the blank area shown in FIG. 8) is sufficient, the conference information of a plurality of conferences may be displayed simultaneously.

As described above, in the conference system 5A according to the first embodiment, when a user operates the image forming apparatus 30, the image forming apparatus 30 displays the information of the conference which is held in the conference room which is placed near the image forming apparatus 30. Therefore, it is possible to motivate the user who is interested in the conference to participate in the conference after the user goes to the image forming apparatus 30 to use the image forming apparatus 30. In particular, because the image forming apparatus 30 provides the information of the conference which is currently held near the image forming apparatus 30 for the user, the user easily participates in the conference, for example, after the user copies the document. As a result, it is possible to promote the participation in the conference.

Figure 9:
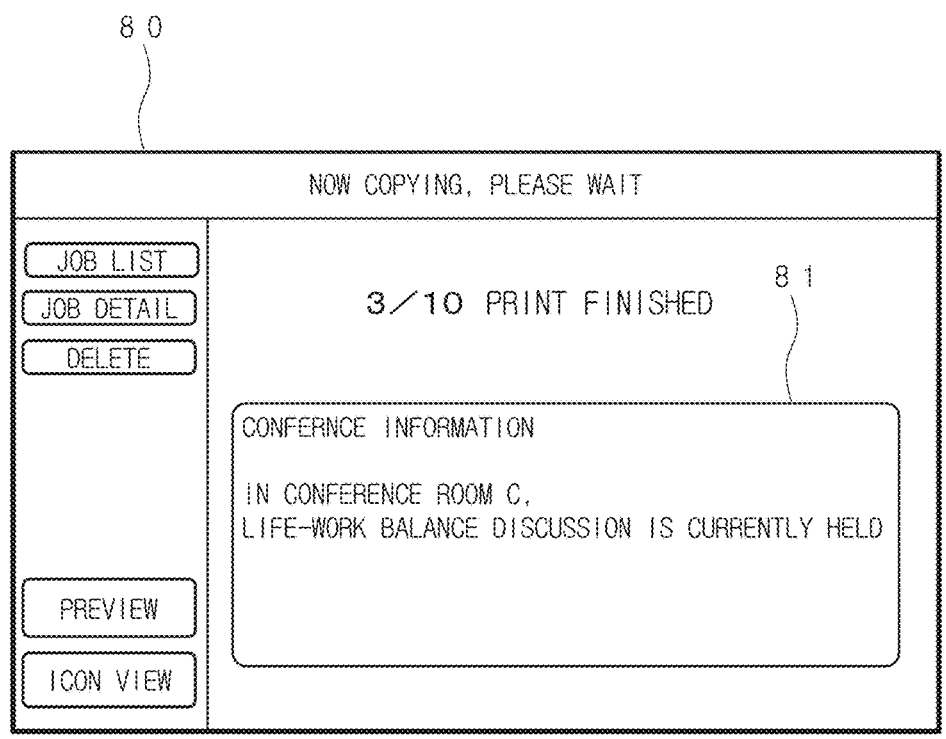
FIG. 9 is a view showing the situation in which conference information is displayed in the operating window.

Further, when the image forming apparatus 30 executes the job which is entered by the user, the conference information may be displayed in the window showing that the image forming apparatus 30 is operating. FIG. 9 shows the window 80 showing that the image forming apparatus 30 is operating (hereinafter, referred to as the operating window 80), which is displayed when copy job which is entered by a user is currently executed. In the blank area of the operating window 80, the conference information display space 81 is provided. In the conference information display space 81, the conference information is displayed. Because the user generally waits for the finish of the execution of the job in front of the image forming apparatus 30 during the execution of the copy job, in case that the conference information is displayed during the execution of the copy job, there is a high possibility that the user reads the displayed conference information. As a result, the user knows the conference which is held near the image forming apparatus 30, and it is possible to motivate the user to participate in the conference.

The conference management server 10A may transmit the conference information of all of the conferences and the entire information of the conference room related information registration table 60 or the information of the conference rooms related to MFP which outputs the conference information request, to the image forming apparatus 30A. Then, the image forming apparatus 30A which receives the above information may select the conference information of the conference which is held near the image forming apparatus 30A.

Further, the conference management server 10A may judge whether each conference is currently held or not. For example, the conference management server 10A judges whether each conference is currently held or not by comparing the date and time of the conference with the current time. Alternatively, in addition to this, in order to judge whether each conference is currently held, it may be judged whether the conference room is currently used in accordance with the information relating to the detection result of the motion sensor provided in the conference room, the switch on/off of the projector provided in the conference room, or the like. Then, the conference room in which the conference is currently held may be specified in accordance with the result of the above judgment.

Second Embodiment

In the second embodiment, the contents of the conference information and the method for displaying the conference information are changed according to the attribute of the user who uses the image forming apparatus 30 (the conference participation history, the specialization, the interested field or the like). In this embodiment, the correlation (relation) between the user who currently uses the image forming apparatus 30 and the conference is calculated, and the conference information of the conference having the higher correlation with the above user is preferentially displayed.

For example, in case that the conference information of a plurality of conferences is displayed so as to alternately display the conference information of each conference, the conference information is displayed in the order of descending correlation. At this time, the conference information of the conference having the higher correlation may be displayed for a longer time. Alternatively, in case that the conference information of a plurality of conferences is displayed as the list at once, the display order of the conference information is controlled so as to display the conference information of the conference having the higher correlation at the upper position of the list. The conference information of the conference having the higher correlation may be displayed in more detail than the conference information of the conference having the lower correlation.

Figure 10:
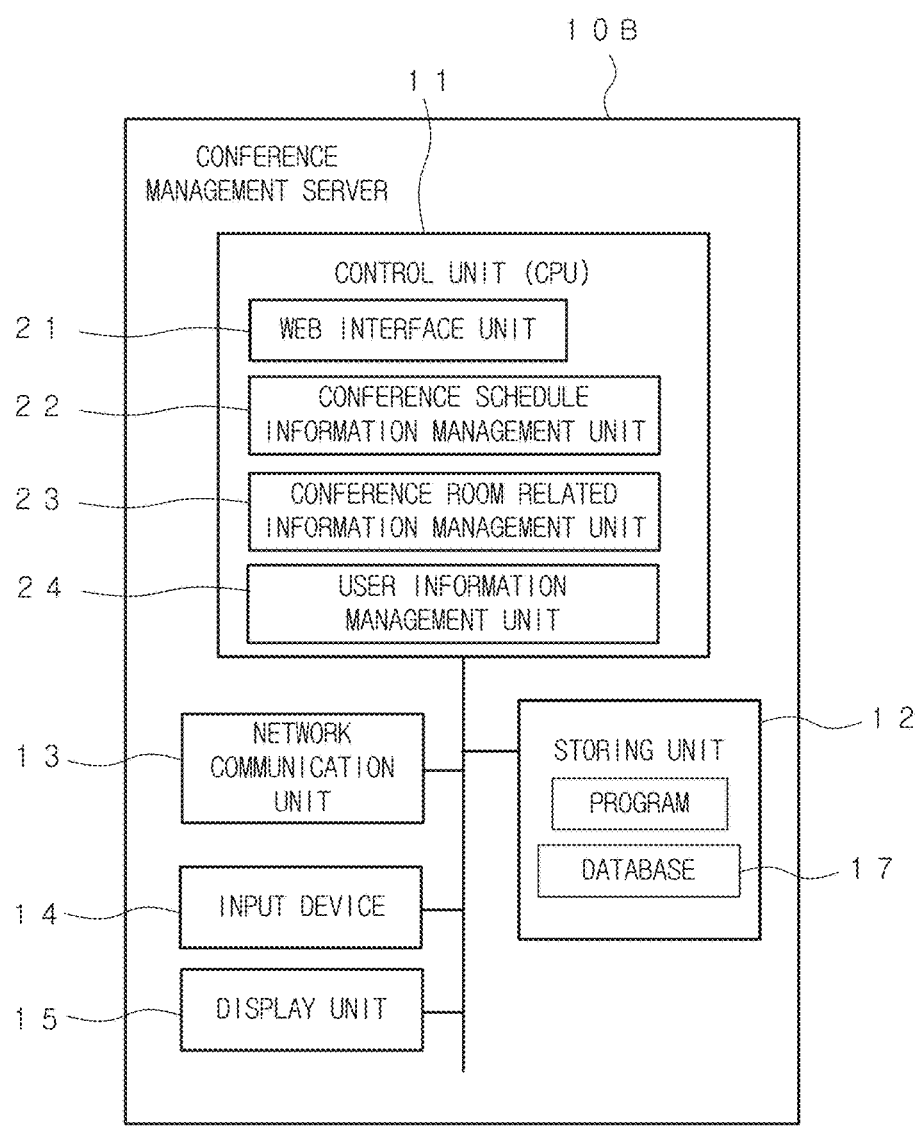
FIG. 10 is a block diagram showing the schematic configuration of the conference management server in the conference system according to the second embodiment.

FIG. 10 is a block diagram showing the schematic configuration of the conference management server 10B in the conference system 5B according to the second embodiment. As compared with the conference management server 10 shown in the first embodiment, the control unit 11 further has the function as the user information management unit 24. The user information management unit 24 registers and manages the conference participation history of each user and the attribute of each user. The other units of the conference management server 10B are the same as those of the conference management server 10A, and the explanation thereof is omitted.

Figure 11:
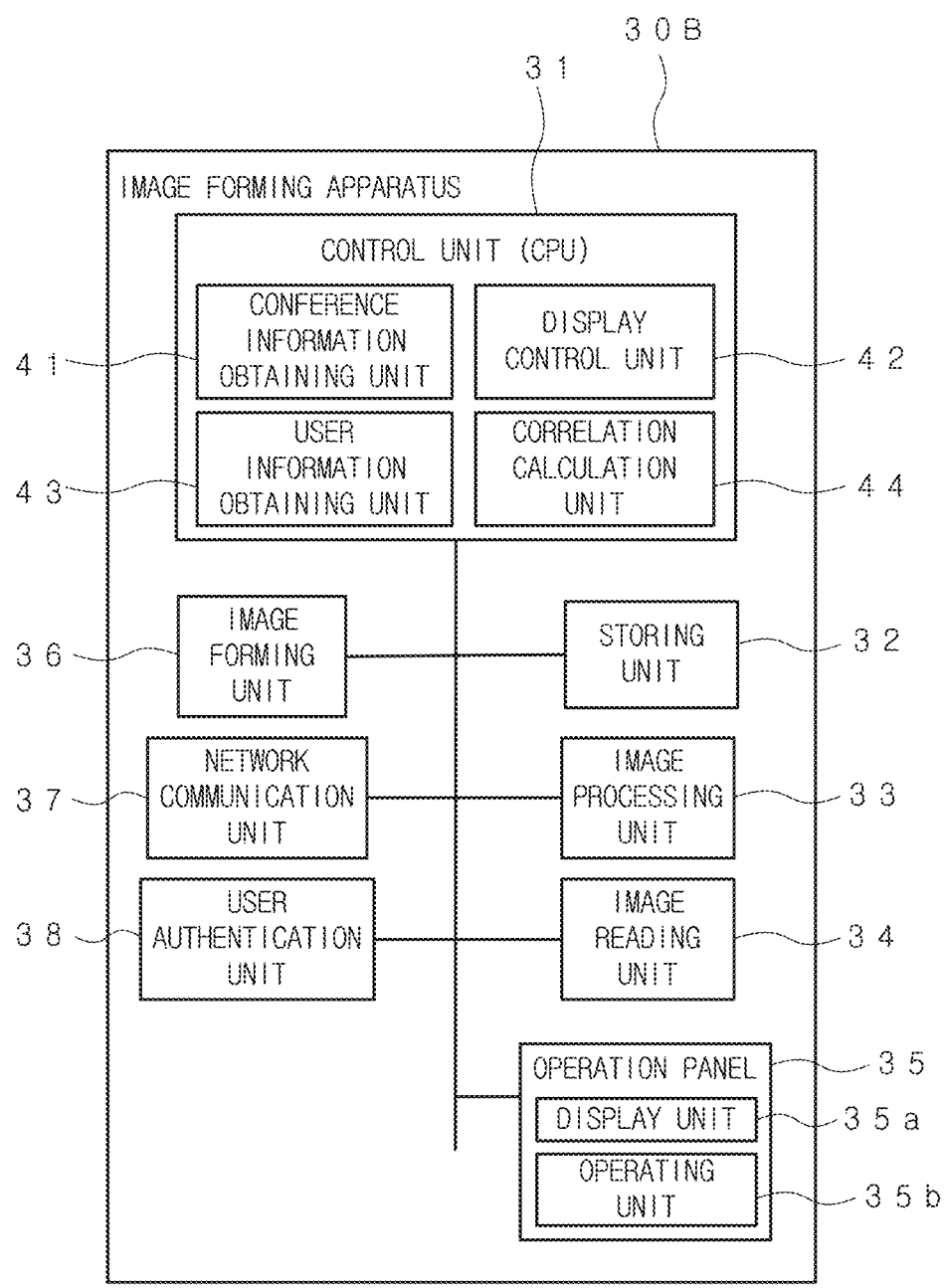
FIG. 11 is a block diagram showing the schematic configuration of the image forming apparatus in the conference system according to the second embodiment.

FIG. 11 is a block diagram showing the schematic configuration of the image forming apparatus 30B according to the second embodiment. As compared with the first embodiment, the control unit 31 further has the function as the user information obtaining unit 43 and the correlation calculation unit 44. The other units of the image forming apparatus 30B are the same as those of the image forming apparatus 30A, and the explanation thereof is omitted.

The user information obtaining unit 43 obtains the attribute information of the user who currently uses the image forming apparatus 30B from the conference management server 10B. The correlation calculation unit 44 calculates the correlation between the user who currently uses the image forming apparatus 30B and the conference.

Figure 12:
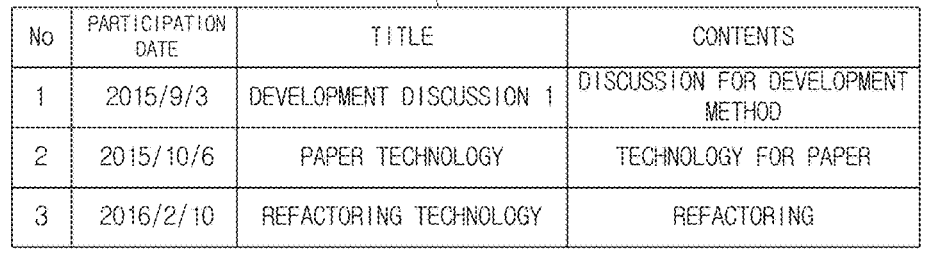
FIG. 12 is a view showing an example of the conference participation history registration table.

FIG. 12 shows an example of the conference participation history registration table 90 which is managed by the user information management unit 24 of the conference management server 10B and in which the conference participation history of one user is registered. In the conference participation history registration table 90, the participation date of the conference and the title and the contents of the conference are registered with respect to each conference which one user participated in. The conference participation history registration table 90 is prepared for each user.

As the registration method for registering the conference participation history in the conference participation history registration table 90, the user or the promoter accesses to the conference management server 10B via the web interface to register the conference participation history. Alternatively, in case that each user has an RFID (Radio Frequency Identification) card, the user's RFID card is detected by a sensor provided in the conference room to automatically register the conference participation history.

FIG. 13 shows the conference information of the conferences which are currently held in the conference rooms C and D placed near MFP2 and which are registered in the conference management server 10B. In the registered conference information 1, the conference held in the conference room C is indicated. In the registered conference information 2, the conference held in the conference room D is indicated.

It is assumed that the conference information shown in FIG. 13 is registered in the conference management server 10B and that the conference participation history of the user who currently uses MFP2 is one shown in FIG. 12. When the user operates MFP2, it is judged that the correlation between the user and the conference indicated in the registered conference information 2 and held in the conference room D is higher than the correlation between the user and the conference indicated in the registered conference information 1 and held in the conference room C. As shown in FIG. 14, in the operation panel 35 of MFP2, the conference information of the above two conferences is displayed by alternately switching the conference information of each conference in the order from (1) the conference information of the conference held in the conference room D (Refactoring method discussion is currently held in the conference room D) to (2) the conference information of the conference held in the conference room C (Life-work balance discussion is currently held in the conference room C). The conference information to be displayed first is preferentially displayed. In case that the correlation is not considered, the conference information of each conference is displayed in the order of the registration of the conference information (the registered conference information 1, 2, . . . ). However, in case that the correlation is considered, the display order of the conference information is changed.

Figure 15:
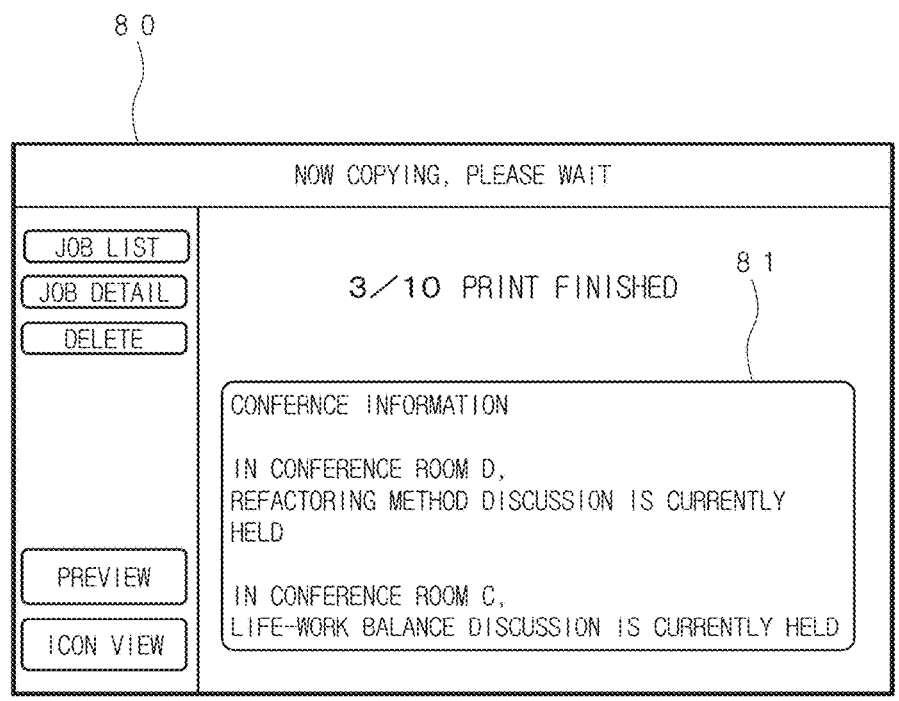
FIG. 15 is a view showing an example in which the conference information of the conference having the higher correlation with the user is preferentially displayed in the operating window.

FIG. 15 is an example in which the conference information of two conferences is simultaneously displayed in the conference information display space 81 in the operating window 80. In the normal situation, the conference information is displayed in the list in the order of the registered conference information 1 and 2, that is, in the order of the conference information of the conference held in the conference room C and the conference information of the conference held in the conference room D. However, in FIG. 15, the display order is changed in accordance with the correlation.

An example of the calculation of the correlation is shown. The title registered in the conference participation history registration table 90 is compared with the title of the conference registered in the conference information, and the correlation is calculated in accordance with the similarity between the above titles.

In detail, the morphological analysis is performed for the title of the conference registered in the conference participation history registration table 90, and the list of the used words (morpheme list) is prepared. In case of the conference participation history registration table 90 shown in FIG. 12, the result of the morphological analysis is as follows.

"Development", "Discussion", "Paper", "Technology" and "Refactoring"

At this time, the word which is frequently used in the conference may be excluded. For example, the words, such as "Discussion", "Meeting" and the like may be excluded. In this case, the word "Discussion" is excluded from the morpheme list, and the words "Development", "Paper", "Technology" and "Refactoring" are registered in the morpheme list 1.

Next, the morphological analysis is performed for each title indicated in the registered conference information 1 and the registered conference information 2 shown in FIG. 13, which is the conference information registered in the conference management server 10B. The morpheme list 2 is prepared in accordance with the registered conference information 1 and the morpheme list 3 is prepared in accordance with the registered conference information 2 as follows.

In case of the registered conference information 1, the morphological analysis is performed for the title "life-work balance", and the morpheme list 2 in which the words "Life", "Work" and "Balance" are registered is prepared.

In case of the registered conference information 2, the morphological analysis is performed for the title "refactoring method discussion", and the words "Refactoring", "Method" and "Discussion" are extracted. Then, the word "Discussion" is excluded, and the morpheme list 3 in which the words "Refactoring" and "Method" are registered is prepared.

In this example, it is checked how many times the words registered in the morpheme list 2 appear in the morpheme list 1 and how many times the words registered in the morpheme list 3 appear in the morpheme list 1. The number of times the words appear is calculated as the correlation. Because the words registered in the morpheme list 2 do not appear in the morpheme list 1, the correlation between the logged-in user and the conference indicated in the registered conference information 1 is 0. On the other hand, because the word "Refactoring" registered in the morpheme list 3 appears in the morpheme list 1, the correlation between the logged-in user and the conference indicated in the registered conference information 2 is 1.

From the above result, because the conference indicated in the registered conference information 2 has a higher correlation with the user than the conference indicated in the registered conference information 1, the conference information of the conference indicated in the registered conference information 2 is displayed prior to the conference information of the conference indicated in the conference information 1.

The correlation is based on the conference participation history as described above. Alternatively, for example, the category of the specialization of the user and the category of the conference are registered, and the correlation may be decided by judging whether the category of the specialization is matched with the category of the conference, or may be calculated by comparing the terms relating to the specialization with the title of the conference.

Figure 16:
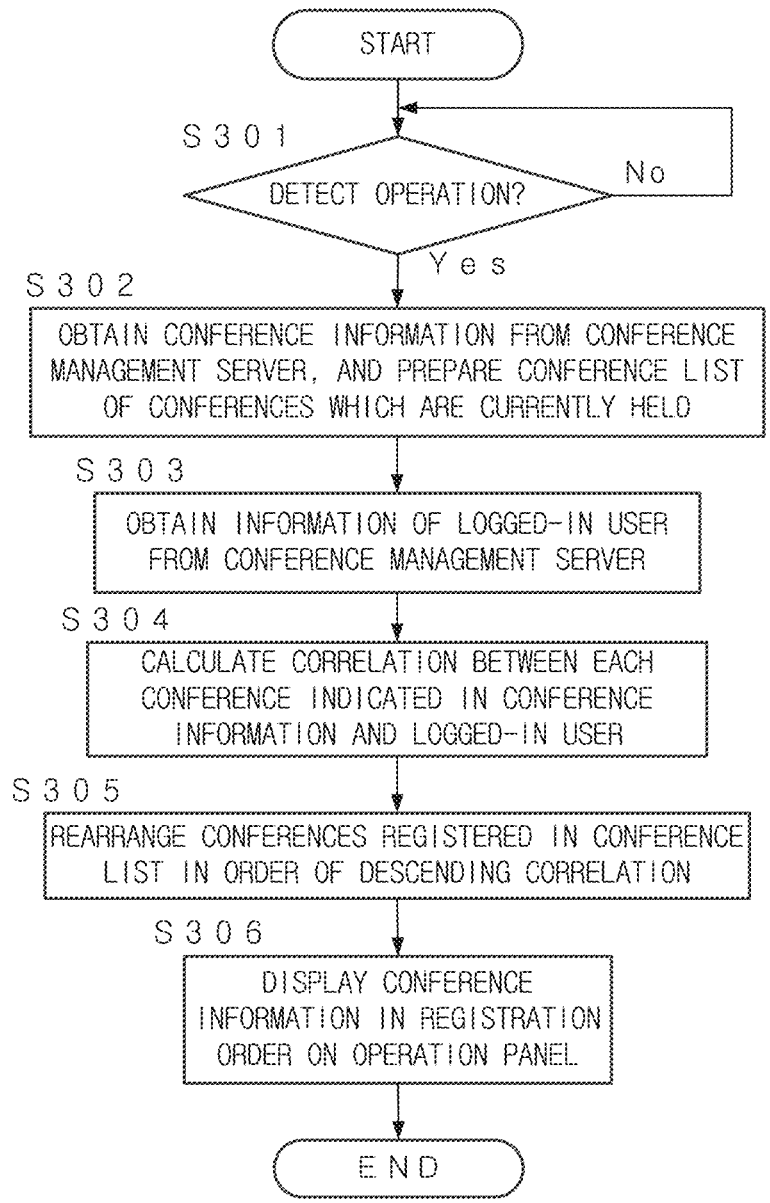
FIG. 16 is a flowchart showing the process which is executed by the image forming apparatus in the conference system according to the second embodiment.

FIG. 16 is a flowchart showing the process which is executed by the image forming apparatus 30B of the conference system 5B according to the second embodiment. The image forming apparatus 30B monitors whether the operation is received from the user (Step S301; No). When the image forming apparatus 30B detects the user's operation (Step S301; Yes), the image forming apparatus 30B obtains the conference information of the conference held in the conference room placed near the image forming apparatus 30B from the conference management server 10B, and prepares the conference list in which the conference information is registered with respect to each conference (Step S302).

Next, the image forming apparatus 30B obtains the attribute information of the user who is recognized by the user identification unit 38 and who currently uses the image forming apparatus 30B (the logged-in user), from the conference management server 10B (Step S303).

The image forming apparatus 30B calculates the correlation between the user and each conference registered in the conference list (Step S304). The conferences registered in the conference list are arranged in the order of descending correlation (Step S305). Then, the conference information registered in the conference list is displayed on the operation panel 35 so as to prioritize the conference information which is earlier registered (Step S306).

As described above, in the second embodiment, in accordance with the conference participation history, the specialization and the like of the user who currently uses the image forming apparatus 30B, the correlation between the user and the conference which is currently held in the conference room placed near the image forming apparatus 30B is calculated. Then, the conference information of the conference having the higher correlation is preferentially displayed. Because the user easily takes notice of the conference information which is preferentially displayed, the user is easily motivated to participate in the conference having the higher correlation with the user who currently uses the image forming apparatus 30B.

The user information management unit 24 may be provided in another device, another server or the like except the conference management server 10B. In this case, the image forming apparatus 30B obtains the attribute information of the user from the device in which the user information management unit 24 is provided. For example, in case that the information to be obtained is the information relating to the specialization of the user, which is not related to the conference participation history, it is not necessary to manage the above information by the conference management server 10B.

Third Embodiment

In the third embodiment, the contents of the conference information and the method for displaying the conference information are changed according to the contents of the original which is read by executing a copy job or a scan job in the image forming apparatus 30. In this embodiment, the correlation (the relation) between the contents of the read original and the conference is calculated, and the conference information of the conference having the higher correlation with the contents of the original is preferentially displayed. For example, in case that the conference information of a plurality of conferences is displayed so as to alternately display the conference information of each conference, the conference information is displayed in the order of descending correlation. Alternatively, in case that the conference information of a plurality of conferences is displayed as the list at once, the display order of the conference information is controlled so as to display the conference information of the conference having the higher correlation at the upper position of the list. The conference information of the conference having the higher correlation may be displayed in more detail than the conference information of the conference having the lower correlation.

Figure 17:
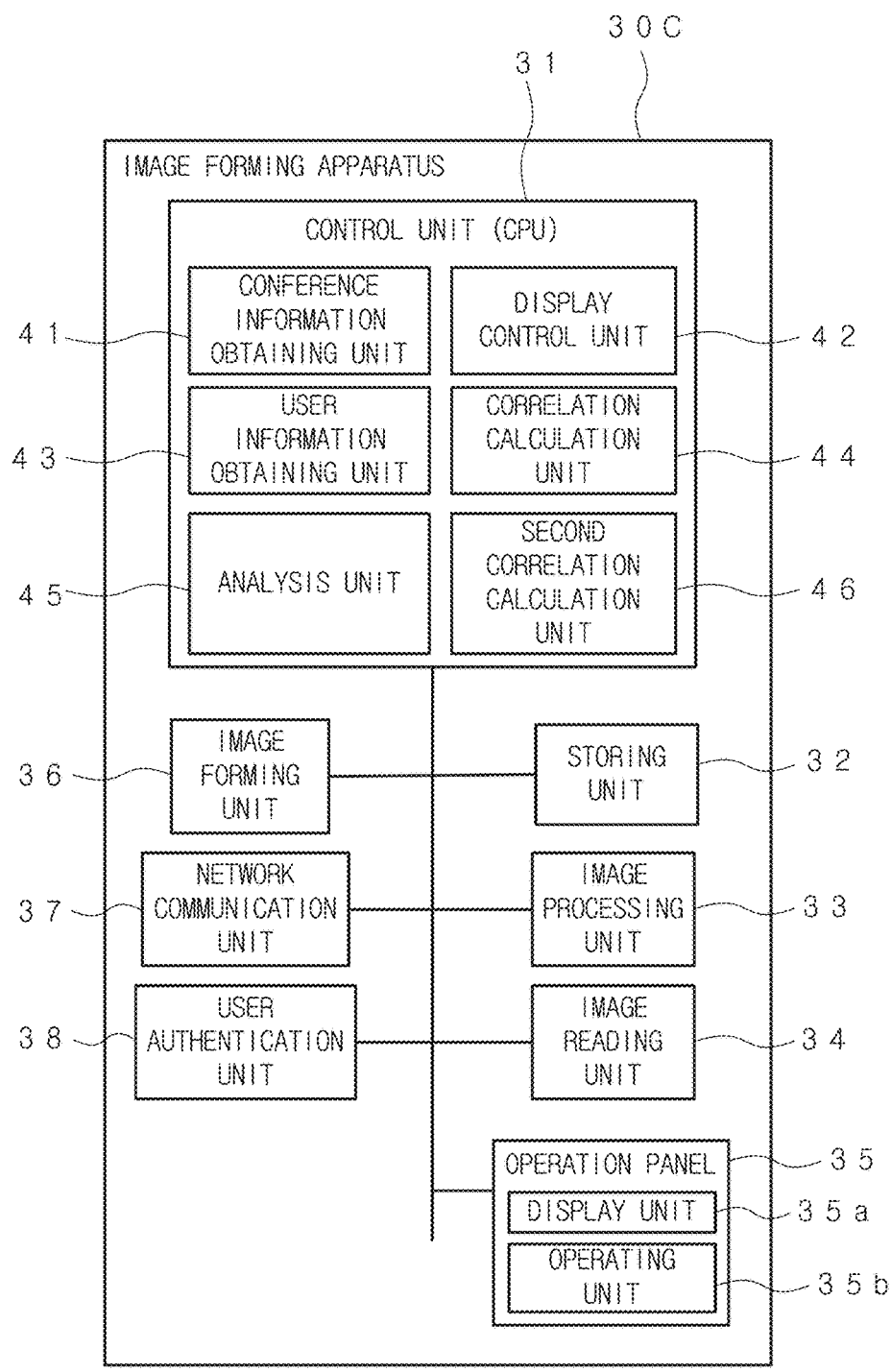
FIG. 17 is a block diagram showing the schematic configuration of the image forming apparatus according to the third embodiment.

FIG. 17 is a block diagram showing the schematic configuration of the image forming apparatus 30C in the conference system 5C according to the third embodiment. As compared with the image forming apparatus 30B shown in the second embodiment, the control unit 31 further has the function as the analysis unit 45 and the second correlation calculation unit 46. The other units of the image forming apparatus 30C are the same as those of the image forming apparatus 30B, and the explanation thereof is omitted. The conference management server 10 may be the same as that of the first embodiment or that of the second embodiment.

The analysis unit 45 analyzes the original which is read by the image reading unit 34 of the image forming apparatus 30C in accordance with OCR (Optical Character Recognition), ICR (Intelligent Character Recognition) or the like, to convert the image data to the text data. The second correlation calculation unit 46 calculates the correlation (the relation) between the text data and the conference information.

The calculation of the above correlation is carried out, for example, in accordance with the frequency of the appearance of each word which is coincident with each word obtained by performing the morphological analysis for the title and the contents of each conference, in the words which are described in the document copied by the user. Alternatively, the related key words are set with the conference information, and the correlation may be calculated in accordance with the number of times the related keywords and the like appear in the document copied by the user. In this case, the words which are generally and frequently used, such as the postpositional particles of Japanese, the prepositions and the like, may be excluded.

For example, it is assumed that the user copies the document relating to the refactoring by using MFP2. Further, it is assumed that the conference information of the conferences held in the conference rooms C and D related to MFP2 is the information shown in FIG. 13.

With respect to the conference information, like the second embodiment, the morphological analysis is performed for the registered conference information 1 and 2.

In case of the registered conference information 1, the morphological analysis is performed for the title "life-work balance", and the morpheme list 2 in which the words "Life", "Work" and "Balance" are registered is prepared.

In case of the registered conference information 2, the morphological analysis is performed for the title "refactoring method discussion", and the words "Refactoring", "Method" and "Discussion" are extracted. Then, the word "Discussion" is excluded, and the morpheme list 3 in which the words "Refactoring" and "Method" are registered is prepared.

The image forming apparatus 30C converts the image data of the read document to the text data by performing the OCR/ICR process. Then, the text contained in the text data is divided into the words in accordance with the morphological analysis. As a result, various types of words are extracted. It is checked how many times the words "Life", "Work" and "Balance" extracted from the registered conference information 1 appear in the read document and how many times the words "Refactoring" and "Method" extracted from the registered conference information 2 appear in the read document.

In this case, it is assumed that the word "Refactoring" appears in the read document four times, the word "Method" appears in the read document twice, and the words "Life", "Work" and "Balance" do not appear in the read document.

As a result, the correlation between the document read by the image reading unit 34 and the conference indicated in the registered conference information 1 is 0. The correlation between the above document and the conference indicated in the registered conference information 2 is 6. The image forming apparatus 30C displays the conference information of the conference indicated in the registered conference information 2 prior to the conference information of the conference indicated in the registered conference information 1.

Figure 18:
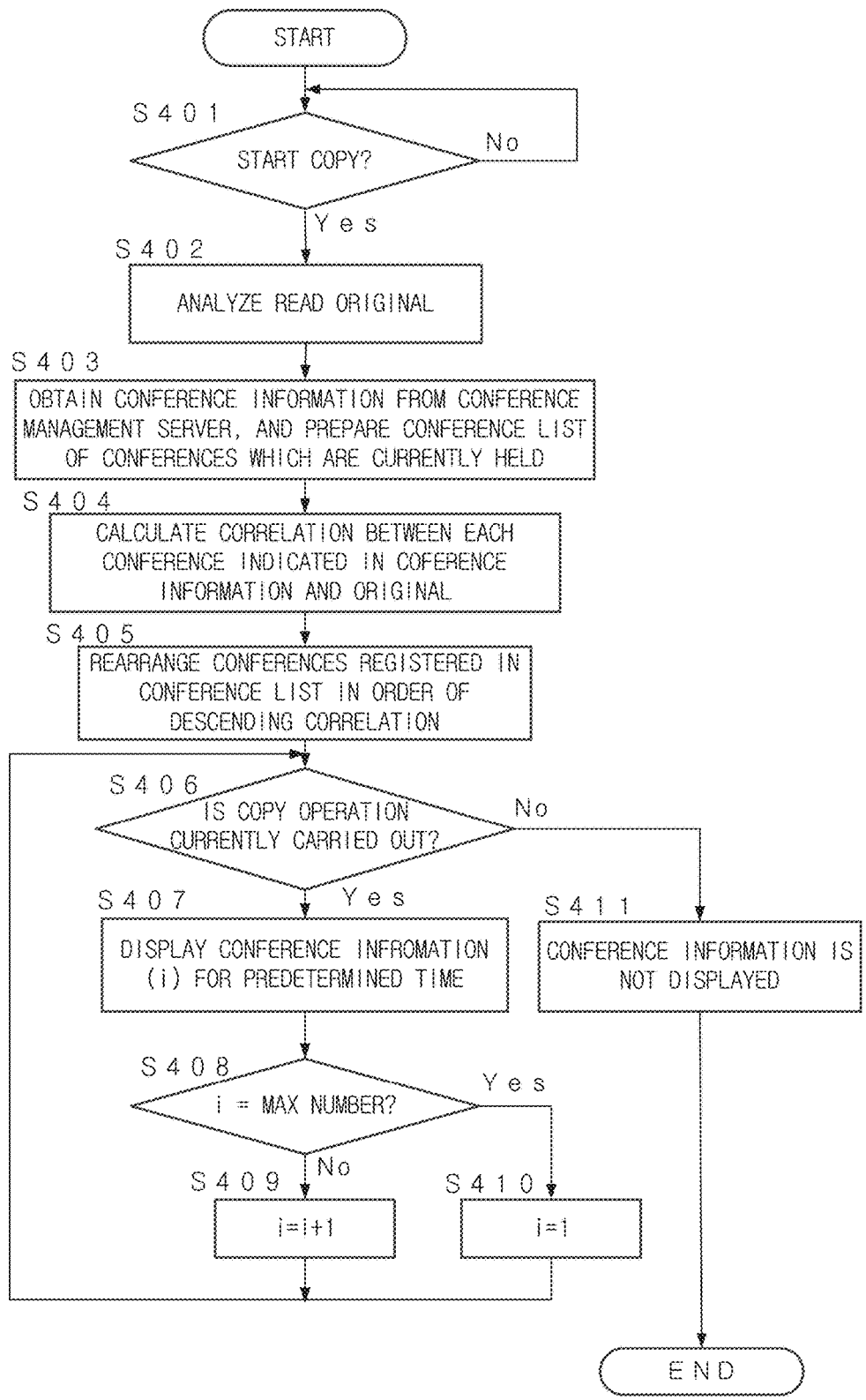
FIG. 18 is a flowchart showing the process which is executed by the image forming apparatus according to the third embodiment.

FIG. 18 shows the flowchart of the process which is executed by the image forming apparatus 30C according to the third embodiment. In this process, the conference information of a plurality of conferences is displayed so as to alternately and periodically display the conference information of each conference in the order of descending correlation repeatedly until the copy operation is finished.

When the image forming apparatus 30C detects the starting of the copy operation (Step S401; Yes), the image forming apparatus 30C analyzes the read original (Step S402). Further, the image forming apparatus 30C accesses to the conference management server 10 to obtain the conference information of the conferences which are currently held near the image forming apparatus 30C from the conference management server 10 and to prepare the conference list (Step S403). The image forming apparatus 30C may judge whether each conference is currently held.

Then, the image forming apparatus 30C calculates the correlation between the original and each conference registered in the conference list (Step S404), and rearrange the conference information of the conference list in the order of descending correlation (Step S405).

The image forming apparatus 30C checks whether the copy operation is currently carried out (Step S406). In case that the copy operation is currently carried out (Step S406; Yes), the i-th conference information (i) from the head of the conference list is displayed in the operating window 80 for the predetermined time (Step S407). The initial value of "i" is 1.

The image forming apparatus 30C checks whether the value i is the same as the number of the conferences registered in the conference list (the maximum number of conferences) (Step S408). When the value i is not the same as the maximum number of the conferences (Step S408; No), the value i is incremented by +1 (Step S409). The process returns to Step S406, and is continued. When the value i is the same as the maximum number of the conferences (Step S408; Yes), because the last conference information of the conference list has been displayed, the value i is reset to 1 (Step S410). Then, the process returns to Step S406.

When the copy operation is finished (Step S406; No), the conference information is not displayed (Step S411). The process is ended.

As described above, in the third embodiment, the correlation between the contents of the original read by the image forming apparatus 30C and each conference held near the image forming apparatus 30C, is calculated. The conference information of the conference having the higher correlation is preferentially displayed. Because it is considered that the original copied by the user is the document relating to the field in which the user is interested, by preferentially displaying the conference information of the conference having the higher correlation with the copied original, the user can be easily motivated to participate in the conference in which the user is interested.

The data to be analyzed is not limited to the data obtained by reading the original in the image reading unit 34. For example, in case that a print job is received from an external device, the data to be analyzed is the print data of the received print job.

Fourth Embodiment

In the fourth embodiment, the user who will transmit a print job to the image forming apparatus by using a PC (Personal Computer) or the like, is guided to the conference room in which the conference is currently held.

Figure 19:
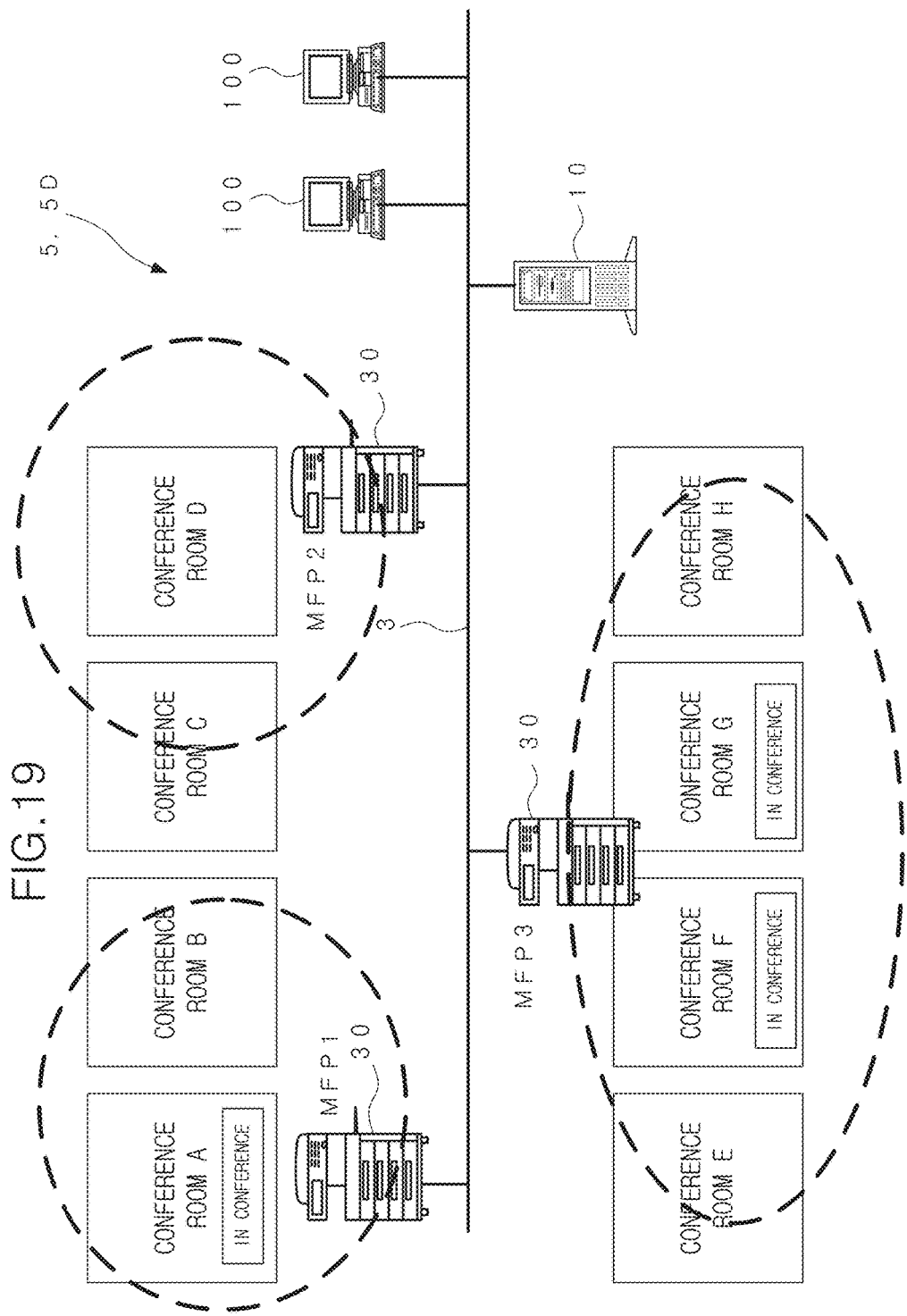
FIG. 19 is an example of the configuration of the conference system according to the fourth embodiment.

FIG. 19 is a view showing an example of the configuration of the conference system 5D according to the fourth embodiment. As compared with the first embodiment, the information processing terminals 100, such as a personal computer, a mobile terminal and the like, are connected with the network 3.

Figure 20:
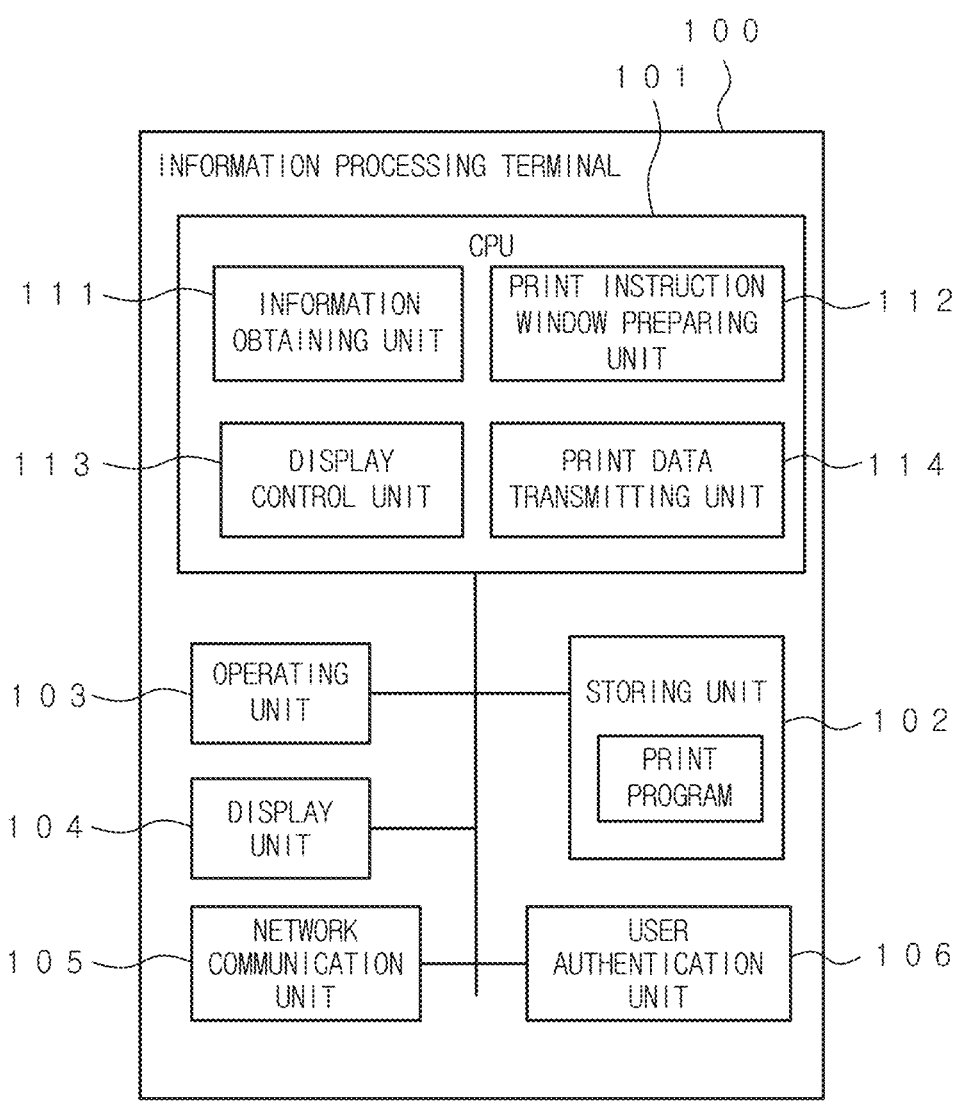
FIG. 20 is a block diagram showing the schematic configuration of the information processing terminal in the conference system according to the fourth embodiment.

FIG. 20 is a block diagram showing the schematic configuration of the information processing terminal 100. The information processing terminal 100 comprises a CPU 101 for entirely controlling the operation of the information processing terminal 100. The CPU 101 is connected with a storing unit 102, an operating unit 103, a display unit 104, a network communication unit 105, a user authentication unit 106 and the like via a bus.

By the CPU 101, a middleware, application programs and the like are executed on an OS program as a base. The storing unit 102 comprises a ROM, a RAM, a nonvolatile memory and the like. In the storing unit 102, the program for displaying the print instruction window (referred to as the print instruction window display program), the OS program, the printer driver, various types of programs and data are stored. By executing various types of processes by the CPU 101 in accordance with these programs, each function of the information processing terminal 100 is realized.

The display unit 103 comprises a liquid crystal display or the like, and has the function for displaying various types of operation windows, setting windows and the like. The operating unit 104 comprises some hardware keys, a touch panel provided on the physical screen of the display unit 103, and the like.

The network communication unit 105 has the function for communicating with the conference management server 10, the image forming apparatuses 30, other external devices and the like via the network 3.

The user authentication unit 106 has the function for authenticating a user (logged-in user) of the information processing terminal 100 like the user authentication unit 38 of the image forming apparatus 30.

The CPU 101 has the function as the information obtaining unit 111, the print instruction window preparing unit 112, the display control unit 113, the print data transmitting unit 114 and the like by executing the print instruction window display program stored in the storing unit 102.

The information obtaining unit 111 obtains the conference information and the conference room related information from the conference management server 10. The print instruction window preparing unit 112 prepares the print instruction window which will be explained later. The display control unit 113 controls the display unit 104 so as to display various types of windows, such as the print instruction window and the like. The print data transmitting unit 114 controls the network communication unit 105 so as to transmit the print job to the image forming apparatus 30 or the conference management server 10.

In general, an application program, such as a document preparation program, a drawing preparation program and the like, has the function for printing an opened document. When the option "print" is selected from the file menu or the like, the print instruction window (the print dialog) which is a window for selecting the image forming apparatus 30 to be instructed to execute the printing and for instructing the selected image forming apparatus 30 to execute the printing, is displayed.

The print instruction window displays the printer list which is the list of the image forming apparatuses 30 (print apparatuses) available for the printing, and receives the selection of the image forming apparatus 30 to be instructed to execute the printing, in the print list from a user. When the instruction for starting the printing is received from the user by pressing down the print button, the information processing terminal 100 creates the print job for printing the opened document and transmits the created print job to the selected image forming apparatus 30.

In general, the display of the print instruction window is one function of the OS. When the option "print" is selected from the file menu and the application program requests the OS to display the print instruction window (the function call is executed for the specific function of the OS), the print instruction window is displayed. The print instruction window can be customized by the third application program which is separated from the OS. As described above, the print instruction window is a common window for various types of application programs which are operated on the OS. Therefore, by customizing the print instruction window on the OS level, the print instruction window which is originally customized can be set to a print instruction window which is displayed when each of the application programs requests the information processing terminal 100 to display the print instruction window. The print instruction window display program according to at least this embodiment has the function for displaying the print instruction window which is originally customized.

The print instruction window display program according to at least this embodiment is the resident software. The print instruction window display program monitors whether the application program, such as the document preparation application or the like, outputs the display request for displaying the print instruction window to the OS. When the application program receives the print request for printing a document from a user via the filing menu or the like and outputs the display request for displaying the print instruction window to the OS, the print instruction window display program interrupts the display process executed by the OS in accordance with the display request. Then, instead of the standard print instruction window of the OS, the print instruction window display program displays the print instruction window which is originally customized (hereinafter, referred to as the customized print instruction window) on the display unit.

The print instruction window display program displays only the image forming apparatuses 30 (print apparatuses) which are provided near the conference rooms in each of which the conference is currently held, in the printer list displayed on the customized print instruction window. Thereby, when a user goes to the image forming apparatus 30 to take the printed document, the user approaches the conference room in which the conference is currently held. Therefore, it is possible to give the user the opportunity to participate in the conference. Further, by looking at the conference information displayed on the operation panel 35 of the image forming apparatus 30 to which the user goes to take the printed document, the user recognizes the contents of the open conference which is held near the image forming apparatus 30. It is possible to motivate the user to participate in the conference when the user is interested in the conference and goes to the image forming apparatus 30 to take the printed document.

Figure 21:
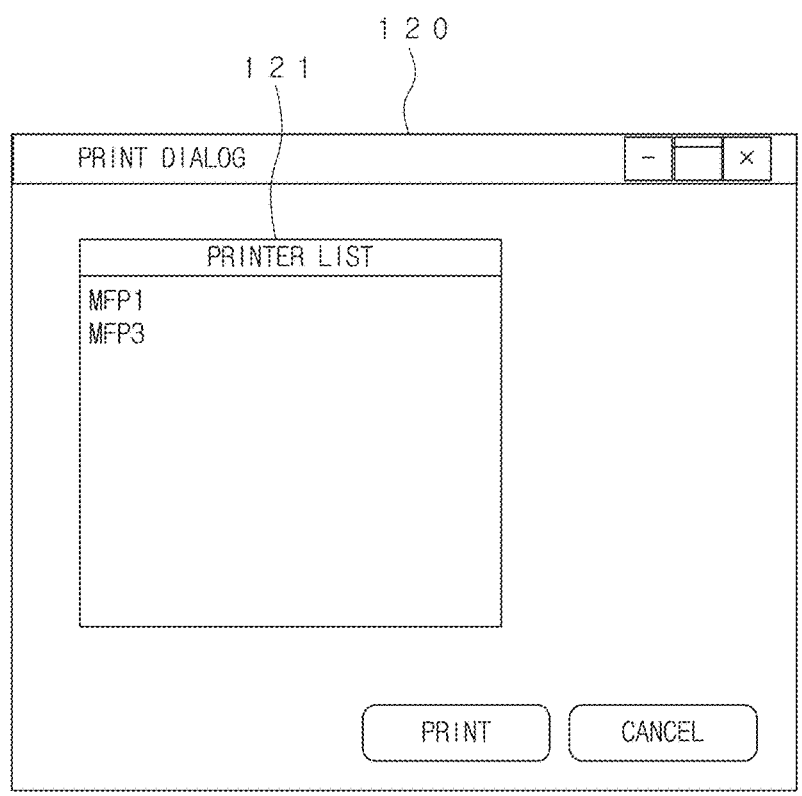
FIG. 21 is a view showing an example of the print instruction window displayed on the display unit of the information processing terminal.

FIG. 21 shows an example of the print instruction window 120 displayed on the display unit 104 of the information processing terminal 100 by the print instruction window display program.

For example, as shown in FIG. 19, it is assumed that MFP1, MFP2 and MFP3 are provided as the available image forming apparatuses 30, and the conference is currently held in each of the conference room A which are placed near MFP1 and the conference rooms F and G which are placed near MFP3. Further, it is assumed that no conference is held in the other conference rooms. In this case, as shown in FIG. 21, the print instruction window display program controls the information processing terminal 100 so as to display only MFP1 and MFP3 and not to display MFP2 in the printer list 121 on the print instruction window 120.

Thereby, the user can select the output destination from only the image forming apparatuses 30 (MFP1 and MFP3) which each conference is held near. When the printing is executed, the conference is currently held near the image forming apparatus 30 to which the user goes to take the printed document. When the user takes the printed document, the user can actually see the situation of the conference. It is possible to motivate the user to participate in the conference in order to increase the possibility that the user participates in the conference. Further, by looking at the conference information displayed on the operation panel 35 of the image forming apparatus 30 to which the user goes to take the print document, the user recognizes the contents of the open conference which is held near the image forming apparatus 30. It is possible to motivate the user to participate in the conference when the user is interested in the conference and goes to the image forming apparatus 30 to take the printed document.

In order to judge whether the conference is held or not, the following process is executed. For example, when the conference is started, the promoter of the conference accesses to the conference management server 10 by using a web interface or the like, and switches on the conference starting flag indicating the starting of the conference. Alternatively, a motion sensor is attached to each conference room. When a human is detected by the motion sensor, it is judged that the conference is currently held in the conference room. In case that a human is not detected by the motion sensor, it is judged that the conference is not held in the conference room. Alternatively, when a projector which is provided in each conference room is switched on, it is judged that the conference room in which the project is switched on is currently used. The output signal of the motion sensor or the information indicating the switching on/off of the projector is transmitted to the conference management server 10 via the network 3. Thereby, the conference management server 10 manages the usage condition of each conference room in accordance with the transmitted information or the like.

Figure 22:
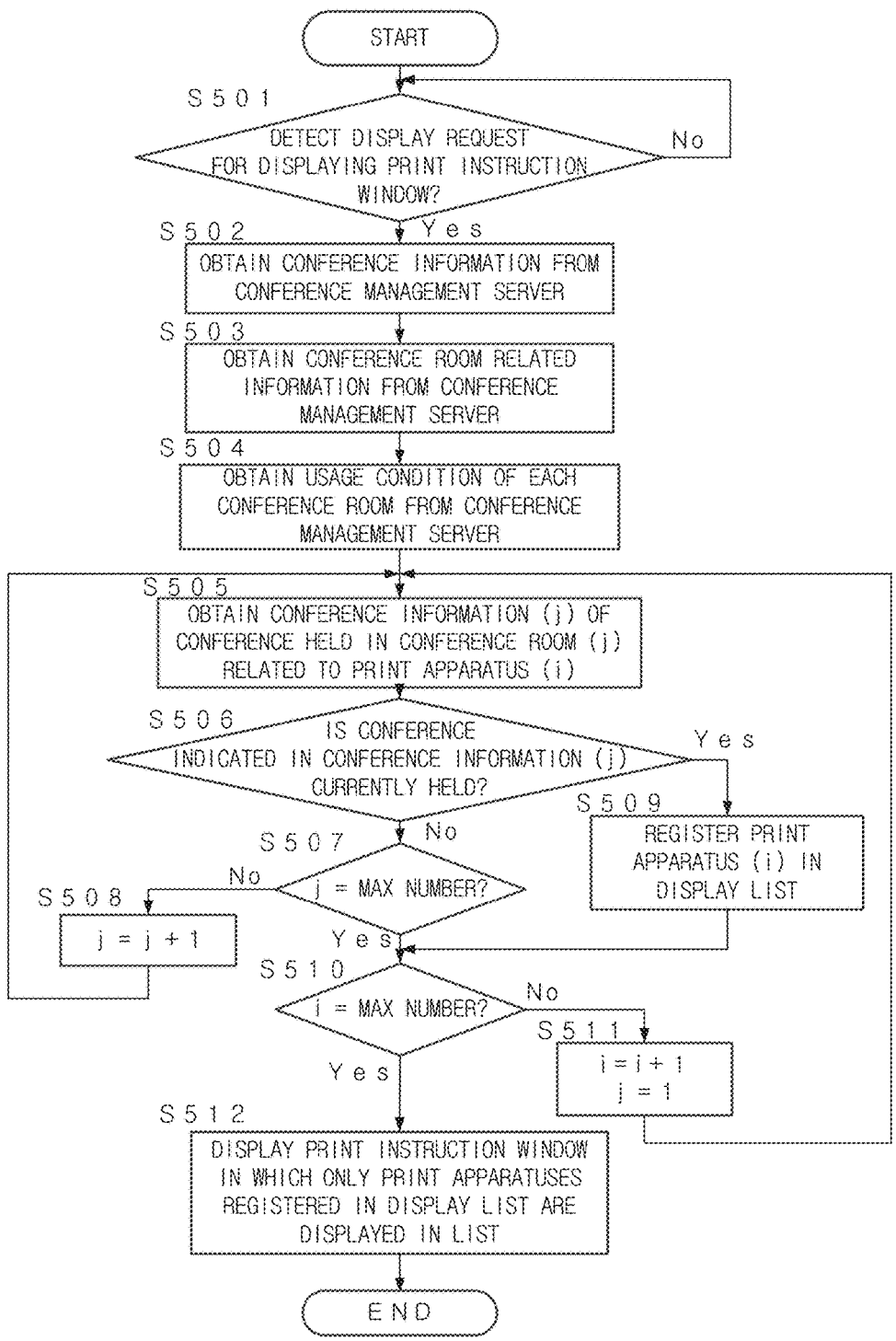
FIG. 22 is a flowchart showing the process which is executed by using the print instruction window display program installed in the information processing terminal.

FIG. 22 is a flowchart showing the process which is executed by the print instruction window display program installed in the information processing terminal 100. The print instruction window display program monitors whether the application program, such as the document preparation application or the like, outputs the display request for displaying the print instruction window (Step S501; No). When the print instruction window display program detects the above display request (Step S501; Yes), the print instruction window display program accesses to the conference management server 10 to obtain the conference information (Step S502).

Further, the print instruction window display program obtains the conference room related information (the information registered in the conference room related information registration table 60) from the conference management server 10 (Step S503). Further, the print instruction window display program obtains the information indicating the usage condition of each conference room (indicating whether the conference is currently held or not in each conference room) from the conference management server 10 (Step S504).

The information processing terminal 100 recognizes the image forming apparatuses 30 on the network 3 and the conference rooms related to each image forming apparatus 30 from the obtained conference room related information. Incase that the conference is currently held in at least one of the conference rooms related to one image forming apparatus 30 (Step S506; Yes), the above one image forming apparatus 30 is registered in the display list (Step S509). On the other hand, in case that the conference is not held in any of the conference rooms related to one image forming apparatus 30 (Step S507; Yes), the above one image forming apparatus 30 is not registered in the display list.

After the above-described check is finished for all of the image forming apparatuses 30 (Step S510; Yes), the print instruction window 120 in which only the image forming apparatuses 30 registered in the display list are listed in the printer list 121, is displayed (Step S512).

In detail, in Step S505 to Step S511 shown in FIG. 22, the following process is executed. In Step S505 to Step S511, the i-th image forming apparatus 30 is referred to as the print apparatus (i), the j-th conference room of the conference rooms related to the print apparatus (i) is referred to as the conference room (j) and the conference information of the conference held in the conference room (j) is referred to as the conference information (j). Each initial value of i and j is 1.

The conference information (j) of the conference held in the conference room (j) related to the print apparatus (i) is obtained (Step S505), and it is judged whether the conference indicated in the conference information (j) is currently held or not (Step S506). In case that the indicated conference is currently held (Step S506; Yes), the print apparatus (i) is registered in the display list (Step S509). Then, the process proceeds to Step S510, and the above-described check is executed for the next print apparatus (the image forming apparatus 30).

In case that the indicated conference is not currently held (Step S506; No), it is judged whether the conference room (j) is the last conference room (j is the maximum number of conference rooms) related to the print apparatus (i) or not (Step S507). In case that the conference room (j) is not the last conference room (Step S507; No), the value j is incremented by +1 (Step S508). Then, the process returns to Step S505, and the above-described check is executed for the next conference room.

In case that the conference room (j) is the last conference room (j is the maximum number of conference rooms) related to the print apparatus (i) (Step S507; Yes), it is checked whether the print apparatus (i) is the last print apparatus (i is the maximum number of print apparatuses) or not (Step S510). In case that the print apparatus (i) is not the last print apparatus (i is the maximum number of print apparatuses) (Step S510; No), the value i is incremented by +1 and the value j is set to 1 (Step S511). Then, the process proceeds to Step S505, and the above-described check is executed for the next print apparatus. In case that the print apparatus (i) is the last print apparatus (Step S510; Yes), the print instruction window in which only the print apparatuses registered in the display list are listed in the printer list is displayed (Step S512).

As explained above, the relation between the image forming apparatus 30 and each conference room which is placed near the image forming apparatus 30 is recognized in accordance with the conference room related information registration table 60. However, for example, the conference management server 10 stores the distance information relating to the distance between the conference room and each image forming apparatus 30. Then, the image forming apparatus 30 obtains the above distance information from the conference management server 10, and recognizes the conference rooms which are placed near the image forming apparatus 30, by comparing the distance and the threshold value.

FIG. 23 shows an example of the distance registration table 130 which is stored in the conference management server 10 and in which the distance between each of the conference rooms and each of the image forming apparatuses 30 is registered.

The image forming apparatus 30 sets the threshold value for judging whether the image forming apparatus is provided near the conference room. Alternatively, the image forming apparatus 30 obtains the above threshold value from the conference management server 10. In case that the distance between the image forming apparatus and the conference room is not more than the threshold value, it is judged that the conference room is placed near the image forming apparatus 30. Then, the image forming apparatus 30 displays the conference information of the conference held in the conference room which is judged as one which is placed near the image forming apparatus 30. When the threshold value is set largely, the conference information of the conference held in the conference room which is placed far from the image forming apparatus 30, is also displayed. When the threshold value is set so as to be larger than the distance to the conference room which is placed the farthest from the image forming apparatus 30, the conference information of the conferences held in all of the conference rooms is displayed on the operation panel 35.

As described above, the embodiments are explained by using the drawings. However, in the present invention, the concrete configuration is not limited to the above embodiments. In the present invention, various modifications of the above embodiments or the addition of various functions or the like to the embodiments can be carried out without departing from the gist of the invention.

In at least one of the embodiments, the place of the conference is explained as the conference room. However, it is not necessary to use a closed room. For example, an opened conference space, such as a lobby, a corner of a passage or the like, is used as the place of the conference.

The copy operation window 70, the operating window 80 and the print instruction window 120 shown in each of the embodiments, are shown as an example. The window configuration thereof is not limited to the window shown in each of the embodiments.

In at least one of the embodiments, the conference room related information registration table is stored and managed in the conference management server 10. The conference room related information registration table may be managed in another device. Further, the conference participation history, the specialization of each user and the like may be managed in another device except the conference management server 10.

In at least one of the embodiments, when the image forming apparatus 30 receives the operation from the user, the image forming apparatus 30 displays the conference information. However, in case that the image forming apparatus 30 detects the user who stays in front of the image forming apparatus 30, the conference information may be displayed on the operation panel 35.

One of the objects of the above embodiments is to provide an image forming apparatus, a non-transitory computer-readable recording medium, a conference system and a method for controlling a conference system which can motivate a person who does not positively participate in the conference to participate in the conference.

In at least one of the embodiments or the like, the image forming apparatus obtains the conference information of the conference held in the conference room which is placed near the image forming apparatus, from the conference management server, and displays the obtained conference information on the operation panel.

In at least one of the embodiments or the like, the image forming apparatus autonomously displays the conference information on the display unit without receiving the request for instructing the image forming apparatus to display the conference information from the user. The conference information is displayed regardless of the user's intention.

In at least one of the embodiments or the like, when the user who approaches the image forming apparatus is detected, or when the operation for entering the job is received, the conference information of the conference held in the conference room which is placed near the image forming apparatus is displayed.

In at least one of the embodiments or the like, the conference information is displayed so as to secure the space for displaying the information necessary for inputting the operation to the image forming apparatus without changing the configuration of the window.

In at least one of the embodiments or the like, the conference information is displayed on the operating window which is displayed during the execution of the job. The user who waits for the finish of the execution of the job is informed of the conference information.

In at least one of the embodiments or the like, the correlation between the attribute of the user (the conference participation history, the specialization or the like) and the contents of the conference is calculated. The conference information of the conference having the higher correlation is preferentially displayed. The user information management device may be included in the conference management server or may be separated from the conference management server.

In at least one of the embodiments or the like, the correlation between the original data used for the image forming, for example, the image data obtained by reading the original in the copy job, the scan job or the like, the document which is output by the print job, and the like, and the conference is calculated. The conference information of the conference having the higher correlation is preferentially displayed.

In at least one of the embodiments or the like, the information processing device displays only the image forming apparatuses which are provided near the conference rooms in each of which the conference is currently held, as the candidates of the output destination in the list of the print instruction window.

According to the image forming apparatus, the non-transitory computer-readable recording medium, the conference system and the method for controlling the conference system, it is possible to motivate a person who does not positively participate in the conference to participate in the conference when the person goes to the image forming apparatus which is provided near the conference room to use the image forming apparatus.

The present U.S. patent application claims the priority of Japanese Patent Application No. 2016-093444, filed on May 6, 2016, according to the Paris Convention, and the entirety of which is incorporated herein by reference for correction of incorrect translation.

What is claimed is:

1. An image forming apparatus, comprising:
    an input unit that inputs an original data;
    an image forming unit that forms an image on a recording sheet in accordance with the original data input by the input unit, and outputs the recording sheet;
    an operation panel that comprises a display unit and an operating unit that receives an operation for entering a job for forming the image on the recording sheet by using the image forming unit;
    a display control unit that displays one or more types of window on the display unit of the operation panel; and
    a conference information obtaining unit that obtains conference information of a conference held in a conference room which is placed near the image forming apparatus, from a predetermined conference management server that manages the conference information of the conference, wherein the image forming apparatus recognizes that the conference room is placed near the image forming apparatus by determining that a distance between the conference room and the image forming apparatus is less than a threshold value,
    wherein the display control unit displays the conference information on the display unit, which is obtained by the conference information obtaining unit from the conference management server, only when the image forming apparatus recognizes that the conference room is placed near the image forming apparatus by determining that the distance between the conference room and the image forming apparatus is less than the threshold value.

2. The image forming apparatus of claim 1, wherein the display control unit displays the conference information on the display unit without receiving a display request for displaying the conference information from a user.

3. The image forming apparatus of claim 1, wherein when a user is detected or when the operation for entering the job is received from the user, the display control unit displays the conference information on the display unit.

4. The image forming apparatus of claim 1, wherein the display control unit displays the conference information in a blank area of the window.

5. The image forming apparatus of claim 1, wherein while the job is executed by using the image forming unit, the display control unit displays an operating window indicating that the job is currently executed, on the display unit, and displays the conference information in the operating window.

6. The image forming apparatus of claim 1, further comprising:
    a user identification unit that identifies a user;
    a user information obtaining unit that obtains an attribute of the user identified by the user identification unit from a predetermined user information management device; and
    a correlation calculation unit that calculates a correlation between the conference indicated in the conference information and the user in accordance with a content of the conference indicated in the conference information obtained from the conference management server by the conference information obtaining unit and the attribute of the user, which is obtained by the user information obtaining unit,
    wherein the display control unit preferentially displays the conference information of the conference having a high correlation with the user.

7. The image forming apparatus of claim 1, further comprising:
    an analysis unit that analyzes a content of a document or a content of an image, which is indicated in the original data, as a content of the original data; and
    a second correlation calculation unit that calculates a correlation between the conference indicated in the conference information and the content of the original data in accordance with a content of the conference indicated in the conference information obtained from the conference management server by the conference information obtaining unit and an analysis result obtained by analyzing the content of the document or the content of the image,
    wherein the display control unit preferentially displays the conference information of the conference having a high correlation with the content of the original data.

8. A conference system, comprising:
    a plurality of the image forming apparatuses of claim 1;
    the predetermined conference management server that manages the conference information of the conference; and
    an information processing terminal that transmits an image forming job to one of the image forming apparatuses,
    wherein the information processing terminal obtains the conference information of the conference from the conference management server and specifies one or more of the conference rooms in which the conference is held,
    the information processing terminal obtains information indicating a relation between the conference room and the image forming apparatus which is provided near the conference room, from the conference management server, wherein it is recognized that the conference room is placed near the image forming apparatus by determining that a distance between the conference room and the image forming apparatus is less than a threshold value; and
    the information processing terminal prepares and displays a print instruction window having a function for receiving a selection of the image forming apparatus to be used for a printing of the image from a list indicating at least one of the image forming apparatuses by displaying the list and a function for receiving an instruction for staring the printing of the image, and displays only the image forming apparatuses which are provided near the specified conference rooms in the list displayed in the print instruction window.

9. A method for controlling a conference system comprising: a plurality of the image forming apparatuses of claim 1; the predetermined conference management server that manages the conference information of the conference; and an information processing terminal that transmits an image forming job to one of the image forming apparatuses, the method comprising:

obtaining the conference information of the conference and specifying one or more of the conference rooms in which the conference is held;

obtaining information indicating a relation the conference room and the image forming apparatus which is provided near the conference room, wherein it is recognized that the conference room is placed near the image forming apparatus by determining that a distance between the conference room and the image forming apparatus is less than a threshold value; and preparing and displaying a print instruction window having a function for receiving a selection of the image forming apparatus to be used for a printing of the image from a list indicating at least one of the image forming apparatuses by displaying the list and a function for receiving an instruction for staring the printing of the image, wherein only the image forming apparatuses which are provided near the specified conference rooms are displayed in the list.

10. A non-transitory computer-readable recording medium in which a program is stored, wherein the program causes an image forming apparatus comprising an input unit that inputs an original data; an image forming unit that forms an image on a recording sheet in accordance with the original data input by the input unit, and outputs the recording sheet; and an operation panel that comprises a display unit and an operating unit that receives an operation for entering a job for forming the image on the recording sheet by using the image forming unit, to:

obtain conference information of a conference held in a conference room which is placed near the image forming apparatus, from a predetermined conference management server that manages the conference information of the conference, wherein it is recognized that the conference room is placed near the image forming apparatus by determining that a distance between the conference room and the image forming apparatus is less than a threshold value, and display the conference information on the display unit, which is obtained from the conference management server, only when it is recognized that the conference room is placed near the image forming apparatus by determining that the distance between the conference room and the image forming apparatus is less than the threshold value.

11. The non-transitory computer-readable recording medium of claim 10, wherein the conference information is displayed on the display unit without receiving a display request for displaying the conference information from a user.

12. The non-transitory computer-readable recording medium of claim 10, wherein when a user is detected or when the operation for entering the job is received from a user, the conference information is displayed on the display unit.

13. The non-transitory computer-readable recording medium of claim 10, wherein the conference information is displayed in a blank area of a window displayed on the display unit.

14. The non-transitory computer-readable recording medium of claim 10, wherein while the job is executed by using the image forming unit, an operating window indicating that the job is currently executed is displayed on the display unit and the conference information is displayed in the operating window.

15. The non-transitory computer-readable recording medium of claim 10, wherein the image forming apparatus further comprises a user identification unit that identifies a user, the program causes the image forming apparatus to:
identify the user by using the user identification unit;
obtain an attribute of the identified user from a predetermined user information management device; and
calculate a correlation between the conference indicated in the conference information and the user in accordance with a content of the conference indicated in the conference information obtained from the conference management server and the obtained attribute of the user, and wherein the conference information of the conference having a high correlation with the user is preferentially displayed.

16. The non-transitory computer-readable recording medium of claim 10, wherein program causes the image forming apparatus to:

analyze a content of a document or a content of an image, which is indicated in the original data, as a content of the original data; and calculate a correlation between the conference indicated in the conference information and the content of the original data in accordance with a content of the conference indicated in the conference information obtained from the conference management server and an analysis result obtained by analyzing the content of the document or the content of the image, wherein the conference information of the conference having a high correlation with the content of the original data is preferentially displayed.

* * * * *